US008495066B2

(12) United States Patent
Aihara et al.

(10) Patent No.: US 8,495,066 B2
(45) Date of Patent: Jul. 23, 2013

(54) PHOTO-BASED VIRTUAL WORLD CREATION SYSTEM FOR NON-PROFESSIONAL VOLUNTEERS

(75) Inventors: Toru Aihara, Machida (JP); Kazutoshi Sugimoto, Machida (JP)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/744,102

(22) PCT Filed: Nov. 22, 2008

(86) PCT No.: PCT/US2008/084443
§ 371 (c)(1),
(2), (4) Date: May 21, 2010

(87) PCT Pub. No.: WO2009/067717
PCT Pub. Date: May 28, 2009

(65) Prior Publication Data
US 2010/0250617 A1    Sep. 30, 2010

(30) Foreign Application Priority Data

Nov. 22, 2007   (JP) ................................. 2007-303391

(51) Int. Cl.
*G06F 17/30* (2006.01)
(52) U.S. Cl.
USPC .......................... 707/737; 382/224; 382/225

(58) Field of Classification Search
USPC ................................. 707/737; 382/224, 225
See application file for complete search history.

(56) References Cited

U.S. PATENT DOCUMENTS

2007/0139546 A1*  6/2007  Baiping et al. ........... 348/333.01
2009/0102931 A1*  4/2009  Yoshikawa et al. ........ 348/207.2

FOREIGN PATENT DOCUMENTS

JP     2000-322435  A     11/2000
JP     2006-313991  A     11/2006

* cited by examiner

*Primary Examiner* — Hung Q Pham
(74) *Attorney, Agent, or Firm* — Ido Tuchman; William J. Stock

(57) ABSTRACT

An image database device which stores images shot by a lot of people who have freely participated to generate a photo-based virtual world. An image database device receives images shot by a plurality of users through communication over a network. The received image has a shooting position represented by common coordinates used among the users, which represent the position where the image is shot, its shooting conditions, and its image attributes. Then, the received image is compared with an image stored in association with a domain including the shooting position of the received image. On condition that the shooting condition lies within a predetermined range and the degree of similarity of images determined is off a predetermined range as the results of the comparison, the domain is divided, and the received image is stored in association with the divided domain, thereby creating an image database.

9 Claims, 34 Drawing Sheets

(1) REGISTER IMAGE 201 IN DOMAIN S (2) REGISTER IMAGE 202 IN SEGMENT S-3 OF DOMAIN S (3) REGISTER IMAGE 203 IN FURTHER SEGMENT S-31 OF DOMAIN S-3

(1)

(2)

(3)

(1) EXAMPLE OF MANAGING DOMAIN BY QUADTREE (2) QUADTREE STRUCTURE (1)

(2)

(3)

VISUALIZATION OF IMAGE DISPLAY SPACE (1) CYLINDRICAL SHAPE (2) SEMI-SPHERE (3) SPHERE (4) PARTICLE

VISUALIZATION OF CASE WHERE IMAGE DISPLAY SPACE IS INCLUDED IN ANOTHER DISPLAY SPACE (1)

ANOTHER DISPLAY SPACE (2)

(1) EXAMPLE OF SEARCHING ADJOINING DOMAIN
(UNIFORM SEGMENTATION)

| 000, 111 | 001, 111 | 010, 111 | 011, 111 | 100, 111 | 101, 111 | 110, 111 | 111, 111 |
|---|---|---|---|---|---|---|---|
| 000, 110 | 001, 110 | 010, 110 | 011, 110 | 100, 110 | 101, 110 | 110, 110 | 111, 110 |
| 000, 101 | 001, 101 | 010, 101 | 011, 101 | 100, 101 | 101, 101 | 110, 101 | 111, 101 |
| 000, 100 | 001, 100 | 010, 100 | 011, 100 | 100, 100 | 101, 100 | 110, 100 | 111, 100 |
| 000, 011 | 001, 011 | 010, 011 | 011, 011 | 100, 011 | 101, 011 | 110, 011 | 111, 011 |
| 000, 010 | 001, 010 | 010, 010 | 011, 010 | 100, 010 | 101, 010 | 110, 010 | 111, 010 |
| 000, 001 | 001, 001 | 010, 001 | 011, 001 | 100, 001 | 101, 001 | 110, 001 | 111, 001 |
| 000, 000 | 001, 000 | 010, 000 | 011, 000 | 100, 000 | 101, 000 | 110, 000 | 111, 000 |

(2) EXAMPLE OF SEARCHING ADJOINING DOMAIN
(ROUGH SEGMENTATION)

| 00,11 | 01,11 | | 10,11 | 11,11 |
|---|---|---|---|---|
| 00,10 | 010, 101 | 011, 101 | 10,10 | 11,10 |
| | 010, 100 | 011, 100 | | |
| 000, 011 | 001, 011 | 010, 011 | 011, 011 | 100, 011 | 101, 011 | 110, 011 | 111, 011 |
| 000, 010 | 001, 010 | 010, 010 | 011, 010 | 100, 010 | 101, 010 | 110, 010 | 111, 010 |
| 000, 001 | 001, 001 | 010, 001 | 011, 001 | 100, 001 | 101, 001 | 110, 001 | 111, 001 |
| 000, 000 | 001, 000 | 010, 000 | 011, 000 | 100, 000 | 101, 000 | 110, 000 | 111, 000 |

FIG. 34

(3) EXAMPLE OF SEARCHING ADJOINING DOMAIN
(FINE SEGMENTATION)

| 0100, 1111 | 0101, 1111 | 0110, 1111 | 0111, 1111 | 1000, 1111 | 1001, 1111 | 1010, 1111 | 1011, 1111 |
|---|---|---|---|---|---|---|---|
| 0100, 1110 | 0101, 1110 | 0110, 1110 | 0111, 1110 | 1000, 1110 | 1001, 1110 | 1010, 1110 | 1011, 1110 |
| 0100, 1101 | 0101, 1101 | 0110, 1101 | 0111, 1101 | 1000, 1101 | 1001, 1101 | 1010, 1101 | 1011, 1101 |
| 0100, 1100 | 0101, 1100 | 0110, 1100 | 0111, 1100 | 1000, 1100 | 1001, 1100 | 1010, 1100 | 1011, 1100 |
| 0100, 1011 | 0101, 1011 | 011,101 | | 1000, 1011 | 1001, 1011 | 1010, 1011 | 1011, 1011 |
| 0100, 1010 | 0101, 1010 | | | 1000, 1010 | 1001, 1010 | 1010, 1010 | 1011, 1010 |
| 0100, 1001 | 0101, 1001 | 0110, 1001 | 0111, 1001 | 1000, 1001 | 1001, 1001 | 1010, 1001 | 1011, 1001 |
| 0100, 1000 | 0101, 1000 | 0110, 1000 | 0111, 1000 | 1000, 1000 | 1001, 1000 | 1010, 1000 | 1011, 1000 |

Overlay coarse labels: 010 111, 011 111, 100 111, 101 111, 010 110, 011 110, 100 110, 101 110, 010 101, 011 101, 100 101, 101 101, 010 100, 011 100, 100 100, 101 100, 0111, 1011, 0110, 1010.

FIG. 35

PHOTO-BASED VIRTUAL WORLD CREATION SYSTEM FOR NON-PROFESSIONAL VOLUNTEERS

CROSS-REFERENCE TO RELATED APPLICATIONS

This application is a continuation application and claims priority under 35 U.S.C. §120 to International Patent Application No. PCT/US2008/084443 filed Nov. 22, 2008, which claims priority to Japanese Patent Application No. 2007-303391 filed Nov. 22, 2007, the entire text of which is specifically incorporated by reference herein.

FIELD OF THE INVENTION

The present invention relates to a method and apparatus for storing images. Particularly, the present invention relates to a method and apparatus for storing shot images to construct virtual space.

BACKGROUND OF THE INVENTION

There have been computer systems that construct virtual space which is a real world reproduced and provide users with the virtual space. There are systems that play a game which generates a virtual world in the virtual space and introduces a so-called avatar representing a person, or simulate a study, analysis or prediction or the like.

In generation of those virtual worlds, virtual space which is a real world reproduced is constructed by the photo-based rendering (image creation) technology that constructs pseudo virtual space by pasting (texture mapping) photographs shot in a real world onto the interior of space containing a user.

As a system using this photo-based rendering technology, there is an exclusive photographing system which efficiently stores a plurality of real shot images sequentially shot at the same time, along with information on the position at which those shots are taken, in an image database system, and reproduces and displays images in real time from an arbitrary position at the time of reproduction to generate a virtual world (see Japanese Unexamined Patent Publication (Kokai) No. H11-168754).

As a technique relating to photo-based rendering, there are a technique of recording a plurality of high-definition images with different gazing directions and a plurality of background images in a recording medium with the gazing directions being search indexes, and, at the time of reproduction, detecting the view direction of an observer and synthesizing the images through image processing (see Japanese Unexamined Patent Publication (Kokai) No. H07-236113), an electro-optic visualization system using positions and postures, and a method of interpolating and generating directional images from a plurality of images acquired from cameras placed in omnidirections (see Japanese Unexamined Patent Publication (Kokai) No. 2002-92597).

As a camera which shoots a real world, there is a digital camera capable of providing a computer with accurate images in the form of digital data. There is a digital camera which has a GPS (Global Positioning System) and an azimuth sensor or a three-dimensional gyro sensor mounted to that digital camera to be able to record a shooting position, a shooting direction and a shooting angle of elevation (see Japanese Unexamined Patent Publication (Kokai) No. 2004-080359).

SUMMARY OF THE INVENTION

However, virtual space which is the reproduction of a real world can be generated by a method of constructing a three-dimensional model of an "object" present in a real world and attribute information (texture, color, material, etc.) thereof and performing photo-realistic rendering. The construction of a three-dimensional model and preparation of images shot by a digital camera as attribute information for each side of the shape of the model for the method need considerable efforts and time, which is not practical. It is necessary to sequentially shoot wide real worlds in Patent Document 1, which is not practical either. Patent Documents 2 to 4 disclose individual techniques, not a technique which is the basis for constructing virtual space.

Faithful reproduction of a real world by the photo-based rendering technology needs to collect a huge number of photographs actually taken at various places, and thus requires cooperation of a lot of people. To use such an enormous number of photographs, it is necessary to store and manage the photographs as images with shooting conditions, attribute information and so forth.

Accordingly, there is a demand for a system that ensures cooperation of many people to quickly generate a virtual world which is the faithful reproduction of a real world, and can generate a virtual world by the cooperation of allowing anybody to freely register images.

It is an object of the present invention to provide an image database device which stores images shot by a lot of people who have freely participated to generate a photo-based virtual world.

In the present invention, images shot by a plurality of users are received over a network. The received images have shooting positions, shooting conditions and image attributes.

On condition that the received images and images associated with the domain of virtual space including shooting positions of the received images satisfy a predetermined requirement, the image database device is characterized by dividing the domain and storing the received images in association with divided domains. More specifically, the present invention has the following characteristic.

The image database device of the present invention conducts communication over a network to receive images shot by a plurality of users. A received image has a shooting position represented by common coordinates used among the users, a shooting condition, and an image attribute of the shot image, as shooting information on the image. Then, on condition that the received image and an image stored in association with the domain of the virtual space including the shooting position of the received image satisfy a predetermined requirement, the domain is divided the received image is stored in association with the divided domain.

This can allow images shot by a plurality of users to be stored as an image database over a network in association with the domain of virtual space including the shooting positions of the images. Therefore, an image database for constructing a virtual world which is the faithful reproduction of a real world based on shot images can be quickly generated by a lot of people. What is more, the information can always be updated by a lot of people. In addition, the updated history or the like can be recorded to be information for reproducing an old world.

Moreover, the image database device further includes determining means for calculating amounts of feature of images and acquiring a degree of similarity of the images, and with the predetermined requirement being such that the shooting condition lies within a predetermined range and the degree of similarity acquired by the determining means is off a predetermined range, the domain is divided, and received images are stored in association with the divided domains. It is therefore possible to efficiently store shot images according to places where the shots have been taken.

Further, the control means divides the domain and repeats division of the domain on condition that an image associated with a re-stored domain exists in the re-stored domain and the image and a received image satisfy the predetermined requirement, and stores the divided domain and the received image in association with each other. It is therefore possible to divide the domain of virtual space to be associated according to an increase in images provided by a plurality of users, and quickly construct an image database which makes the association of the domain of virtual space closer with shot images closer to that of a real world.

Furthermore, the common coordinates used among the users are a latitude and a longitude. Accordingly, a lot of people can freely participate to provide shot images, thus allowing an image database close to a real world to be constructed quickly.

Moreover, the shooting condition includes a shooting direction, and on condition that the shooting direction is off a predetermined range, the control means stores an image having the shooting direction and the domain in association with each other, thereby storing the image classified by the shooting direction. Accordingly, the control means classifies images shot by a lot of people by the shooting direction for each domain, so that an image database closer to a real world can be constructed quickly.

Further, the shooting condition includes a shooting angle of elevation, and on condition that the shooting angle of elevation is off a predetermined range, the control means stores an image having the shooting angle of elevation and the domain in association with each other, thereby storing the image classified by the shooting angle of elevation. Accordingly, the control means classifies images shot by a lot of people by the shooting angle of elevation for each domain, so that an image database closer to a real world can be constructed quickly.

Furthermore, the shooting condition includes a shooting date, and on condition that the shooting date is off a predetermined range, the control means stores an image having the shooting date and the domain in association with each other, thereby storing the image classified by the shooting date. Accordingly, the control means classifies images shot by a lot of people by the shooting date for each domain, so that an image database closer to a real world can be constructed quickly. As images having shooting dates are managed, the images can be information for reproducing an old world.

According to the present invention, an image database for constructing a virtual world which is the faithful reproduction of a real world based on shot images can be created by a lot of people who freely participate over a network. This permits quick collection of shot images from a wide range of places, and permits the information to be always updated by a lot of people. In addition, the updated history or the like can be recorded to be information for reproducing an old world.

According to the present invention, shot images are stored in association with the divided domain divided by the domain dividing means. It is therefore possible to efficiently store shot images according to places where the shots have been taken.

The present invention can provide an image database device which stores images shot by a lot of people who have freely participated to generate a photo-based virtual world.

BRIEF DESCRIPTION OF THE SEVERAL VIEWS OF THE DRAWINGS

FIG. 34 presents diagrams (1) and (2) showing an example of a search for an adjoining domain; and FIG. 35 presents a diagram (3) showing an example of a search for an adjoining domain.

DETAILED DESCRIPTION OF THE INVENTION

Figure 1:
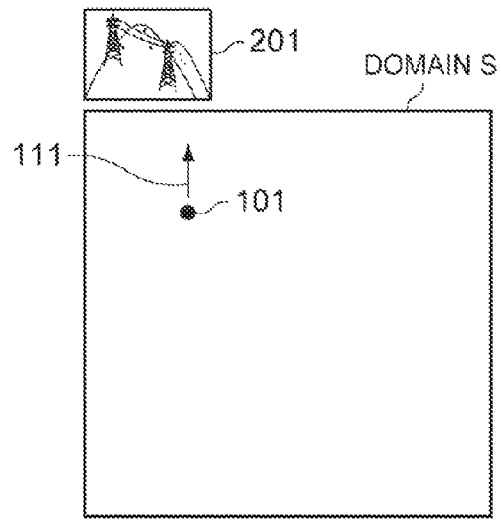
FIG. 1 is a diagram showing the outline of the subject matter according to an embodiment of the present invention.
Figure 1:
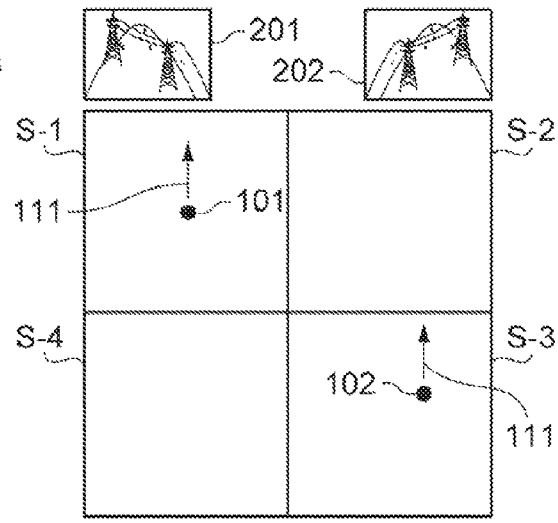
Figure 1:
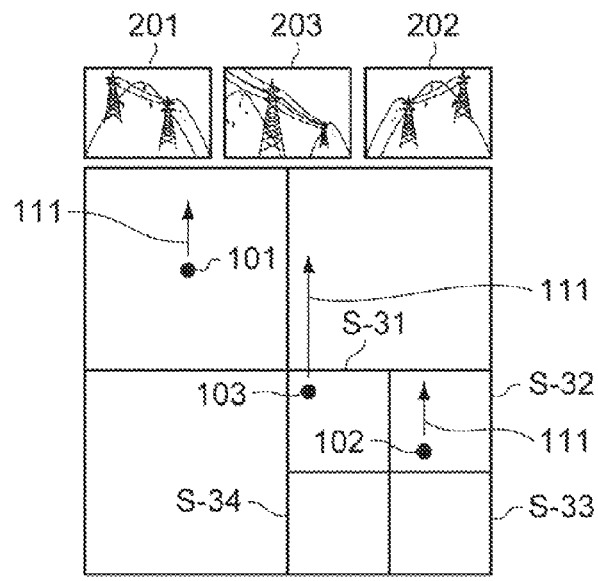

An embodiment of the present invention will be described below.

An image for constructing virtual space has shooting position information to be associated with the domain of the virtual space. The shooting position information is expressed by common coordinates (e.g., a latitude and a longitude) used among a lot of participating people. Because images provided by a lot of participating people can be joined, synthesized or subjected to removal of an obstruction, the images are images of a real world actually shot. In the embodiment, the target is, for example, an image shot by a digital camera. While the shooting position of the image is preferably latitude and longitude information acquired by the GPS function or so installed in a digital camera, it may be position information (e.g., the input latitude and longitude) separately and additionally input to image data.

Shooting conditions for images a lot of people who have participated include a shooting direction, a shooting angle of elevation, a shooting distance and a shooting date (date, time) in addition to the shooting position. Further, attribute information includes an image size, resolution, shutter speed, lens aperture, and focal distance. Those pieces of information may be automatically added to an image by the performance of a digital camera or may be added as the information is additionally input by a separate device. An image which has actually been shot and has position information, a shooting condition and attribute information is called "real shot image".

Real shot images which are provided by a lot of participating people are stored in association with the domain of virtual space based on the shooting positions of the real shot images. A shooting position is expressed by, for example, a latitude and longitude, and the range of the domain of the virtual space is determined by, for example, the range defined by latitudes and longitudes. It is therefore possible to associate a shooting position with the domain of virtual space including the shooting position. Then, a shot image is stored in association with the domain of virtual space to be registered in an image database (DB).

The registration is performed as follows. When an image is not registered in the domain of virtual space including the shooting position, the image is registered in association with the domain. When an image is registered in the domain of virtual space including the shooting position, a shot image is compared with the registered image. Through comparison and determination and on condition that the shooting condition (shooting direction, shooting angle of elevation or the like) is off a predetermined range, the shot image is registered in the same domain. On condition that the shooting condition (shooting direction, shooting angle of elevation or the like) is in the predetermined range, and the degree of similarity is in a predetermined range, the shot image is likewise registered in the same domain. Through comparison and determination and on condition that the shooting condition (shooting direction, shooting angle of elevation or the like) is in the predetermined range, and the degree of similarity is off the predetermined range, on the other hand, the shot image is registered in a different domain. The division of the domain and the comparison and determination of an image are repeated until the condition for registering image is satisfied.

The real shot image registered in association with the domain of virtual space is rendered based on the viewpoint position and view direction of viewing an image in the virtual space. That is, a domain including a shooting position equivalent to a viewpoint position is acquired based on the viewpoint position, and that of real shot images associated with the acquired domain which corresponds to the view direction is acquired. Then, the acquired real shot image is rendered based on display space.

A description will be given below referring to the drawings.

FIG. 1 is a diagram showing the outline of the subject matter according to an embodiment of the present invention. The following will describe registration of a real shot image in the domain of virtual space including the shooting position. of the real shot image based on the shooting position thereof.

FIG. 1(1) shows that a digital camera has shot an image 201 in an arrow direction 111 from a shooting position 101. Because there is no image registered in a domain S of virtual space corresponding to the shooting position 101, the image 201 is registered in the domain S as an image in the arrow direction 111.

FIG. 1(2) shows that a digital camera has shot an image 202 in the arrow direction 111 from a shooting position 102. The image 202 is compared with the image 201 already registered in the domain S of virtual space corresponding to the shooting position 102, and as the degree of similarity is off a predetermined range, it is registered as an image in the arrow direction 111 in a virtual space domain S-3 corresponding to the shooting position 102 among domains S-1, S-2, S-3, S-4 which are quadridomains of the domain S. The image 201 is changed to be registered as an image in the arrow direction 111 for the virtual space domain S-1 corresponding to the shooting position 101.

FIG. 1(3) shows that a digital camera has shot an image 203 in the arrow direction 111 from a shooting position 103. The image 203 is compared with the image 202 already registered in the domain S-3 of virtual space corresponding to the shooting position 103, and as the degree of similarity is off a predetermined range, it is registered as an image in the arrow direction 111 in a virtual space domain S-31 corresponding to the shooting position 103 among domains S-31, S-32, S-33, S-34 which are further quadridomains of the domain S-3. Likewise, the image 202 is changed to be registered as an image in the arrow direction 111 for the virtual space domain S-32 corresponding to the shooting position 102.

Figure 2:
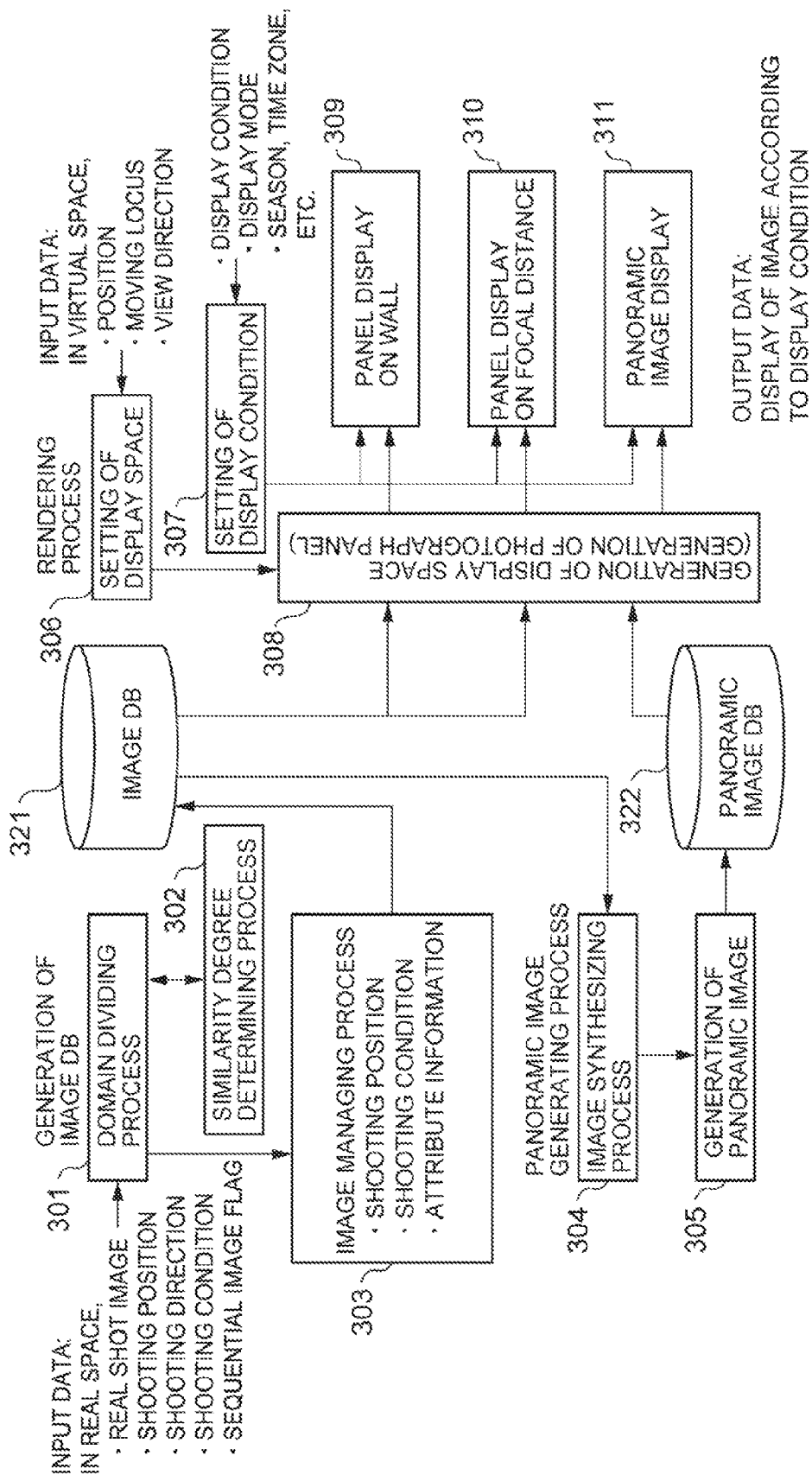
FIG. 2 is a diagram showing the outline of a system according to the embodiment.

FIG. 2 is a diagram showing the outline of a system according to the embodiment. Real shot images are registered in the domain of virtual space based on the shooting position, and an image database (DB) and panoramic image database (DB) are generated. The following will describe the creation of display space based on real shot images registered in the generated image DB 321 to generate virtual space.

A real shot image shot in a real world includes information such as a shooting position where the shot has been taken, a shooting direction, a shooting condition or panoramic image information (sequential image flag or the like which enables registration of a panoramic image). In generating an image DB 321, a domain dividing process 301 divides the virtual space based on the result of determination of a similarity degree determining process 302. An image managing process 303 registers real shot images classified according to the shooting direction, the shooting condition (shooting date, focal distance), etc. in the divided domain. In the rendering process, display condition generation 308 is carried out based on a display space setting 306 (position, moving locus and view direction in virtual space) and a display condition setting 307 (e.g., display mode, season, time zone or the like as the display condition). Space needed for panel display on wall 309, panel display on focal distance 310 or panoramic image display 311 (the shape of a cylindrical shape, semi-sphere, sphere or the like, or the shape to which a panel is to be adhered or the like) is generated in the display condition generation 308. In a panoramic image generating process, panoramic image generation 305 is carried out based on the image DB 321 in the image synthesizing process 304, thus generating a panoramic image DB 322.

Figure 3:
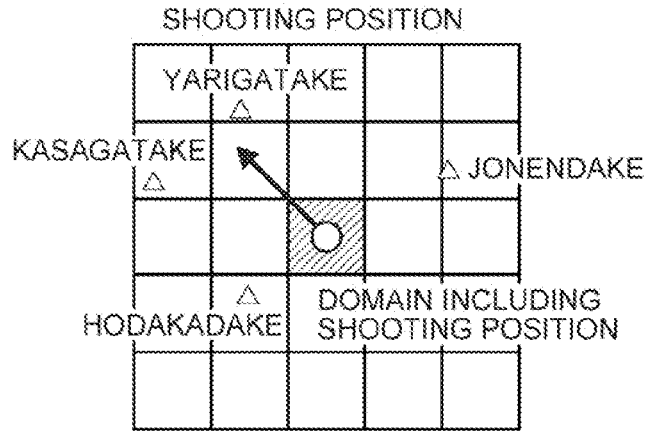
FIG. 3 is a diagram illustrating a shooting position and a shooting condition.
Figure 3:
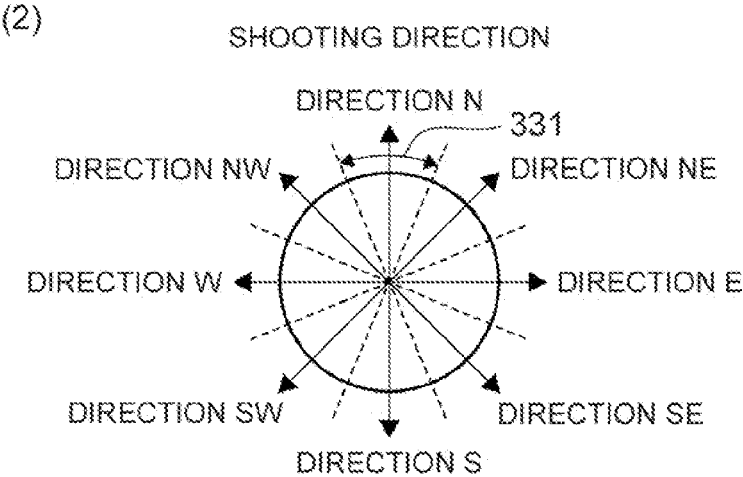
Figure 3:
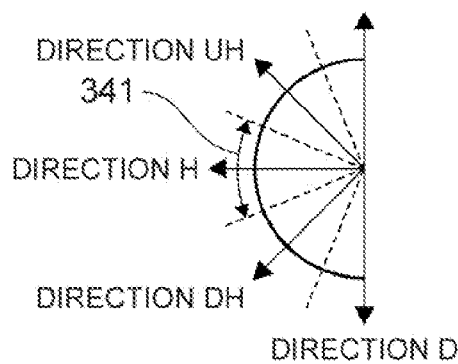

FIG. 3 is a diagram illustrating a shooting position and a shooting condition.

FIG. 3(1) is a diagram showing that the photograph of a real landscape is taken in one shooting direction from one shooting position. A real shot image shot in the above manner has a shooting position and a shooting condition such as a shooting direction.

FIG. 3(2) is a diagram showing an example of classifying the shooting direction into eight directions (North (N), North East (NE), East (E), South East (SE), South (S), South West (SW), West (W) and North West (NW)). In case of classifying the shooting direction into eight directions, a shooting direction 331, for example, is included in the range of the shooting direction N. The shooting directions can be 16 directions, 32 directions, etc.

FIG. 3(3) is a diagram showing an example of classifying the shooting angle of elevation into five directions (upward (U), obliquely upward (UH), horizontal (H), obliquely downward (DH), and downward (D)). In case of classifying the shooting angle of elevation into five directions, a shooting elevation angle 341, for example, is included in a range H of the shooting angle of elevation. The shooting angles of elevation can be nine directions or the like.

Figure 4:
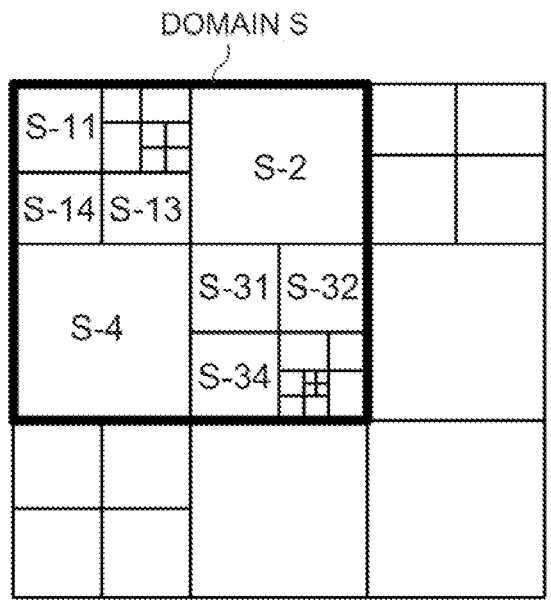
FIG. 4 is a diagram showing an example of managing domains with a quadtree.
Figure 4:
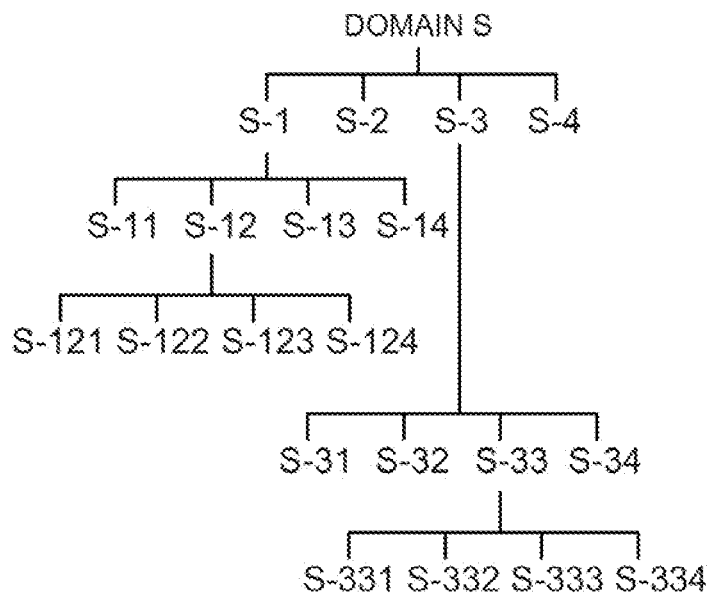

FIG. 4 is a diagram showing an example of managing domains with a quadtree. The following will describe that the domain of virtual space is quad-segmented and real shot images are registered in the segmented domains.

FIG. 4(1) shows an example of the results of dividing a domain S. It is shown that S-1 to S-4 are given clockwise as domain IDs, and the dividing result S-1 is further divided into S-11 to S-14, and the dividing result S-3 is further divided into S-31 to S-34. The division of the domain is carried out by dividing a range defined by latitudes and longitudes into four. Then, a real shot image is compared with an image registered in the divided domain including the shooting position, and on condition that a predetermined requirement is fulfilled, the real shot image is registered in the same domain. The division of the domain is repeated until the requirement that enables registration of the images is fulfilled.

FIG. 4(2) shows that divided domains are managed with a quadtree. With the domain S being quad-segmented, S-1 to S-4 are given as the domain IDs, and S-1 is further divided into S-11 to S-14. FIG. 4(2) likewise shows that S-12, S-3, and S-33 are further divided into S-121 to S-124, S-31 to S-34, and S-331 to S-334, respectively. Therefore, a domain including a shooting position can be acquired from the shooting position. Division can be bisegmentation into the vertical direction and the horizontal direction, so that domains can be managed with a binary tree.

Figure 5:
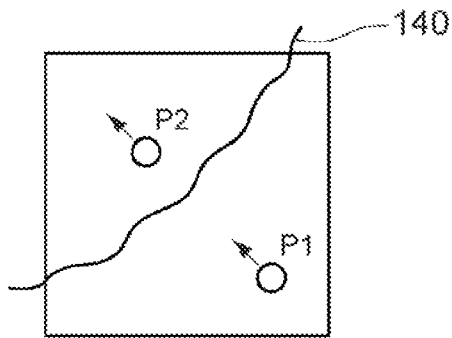
FIG. 5 is a diagram showing an example in a case where there is an obstruction.
Figure 5:
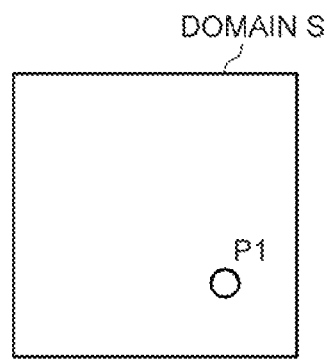
Figure 5:
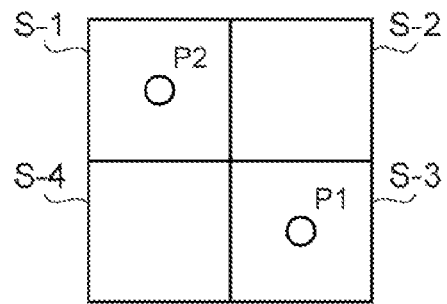

FIG. 5 is a diagram showing an example in a case where there is an obstruction. The following will describe division of a domain when there is an obstruction and registration of a real shot image in a divided domain.

FIG. 5(1) shows a case where there is an obstruction 401 between a shooting position P1 and a shooting position P2. FIG. 5(2) shows that an image shot at the shooting position P1 is registered in a domain S of virtual space including the shooting position P1. FIG. 5(3) shows that the image shot at the shooting position P2 after registration of the image shot at the shooting position P1 differs from the image registered in the domain S of virtual space including the shooting position P2, that the domain S is repeatedly divided until the shooting positions P1 and P2 are included in different domains, and that the image shot at the shooting position P2 registered in the divided domain S-1 of the virtual space including the shooting position P2, and the image shot at the shooting position P1 is registered in the divided domain S-3 of the virtual space including the shooting position P1.

Figure 6:
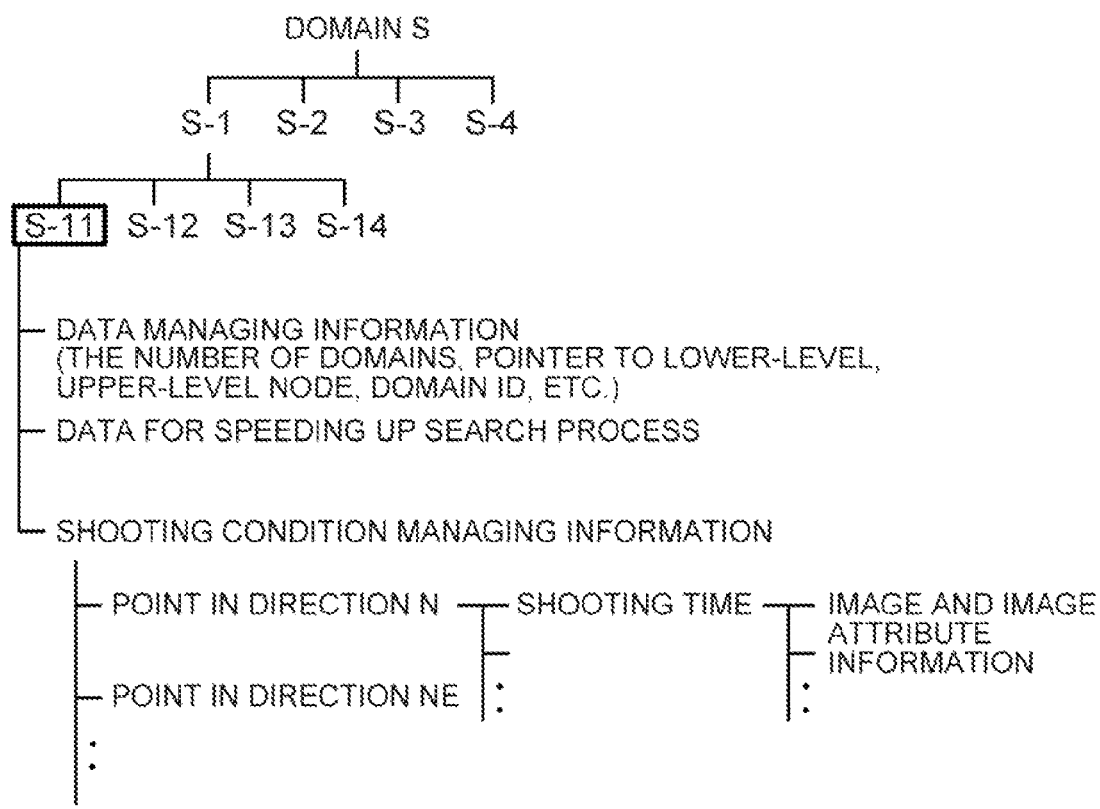
FIG. 6 is a diagram showing an example of an image database which manages domains with a quadtree.

FIG. 6 is a diagram showing an example of an image database which manages domains with a quadtree. FIG. 6 shows the outline of the image database where data of real shot images, shooting conditions and image attributes are classified and registered for each divided domain.

The domain S is divided into S-1 to S-4, and S-1 is further divided into S-11 to S-14. Each divided domain has data managing information (coordinates of a domain, the number of domains, pointers to lower-level and upper-level nodes, domain ID, etc.), and data for speeding up a search process. Further, a shooting time or so is stored as shooting condition managing information for each shooting direction, and (it) is used to store, classify, and mange image and their image attribute information (image size, resolution, other camera's attribute information, etc.). Furthermore, there is a pointer to the panoramic image DB.

For example, there is data of real shot images for each shooting direction in a predetermined range. The real shot image data for the individual shooting directions is indicated by pointers in, for example, eight directions. Further, real shot images are classified and managed by the shooting time (season, morning, daylight or night, time, etc.). Furthermore, if there is distance data to a focused subject, the information is classified and managed by the distance to the subject.

In a case of shooting a real world, photographs at the same place and in the same direction have different images depending on the season and the time zone of a day, so that the degree of similarity of an image is checked on the time axis, and, if the degree of similarity does not lie within a predetermined range, the time space is divided to manage contents. That is, the time space is classified into a time zone like a shooting time, which is registered in a domain.

A method of searching image data is executed based on the structure of the image database. That is, in registering an image, its shooting position is used to obtain the domain of virtual space including the shooting position and to acquire a real shot image registered in the domain. That is, because the domain of virtual space is managed with a quadtree, the domain including the shooting position can be acquired by tracing the tree structure and comparing the position with the coordinates in the range of the domain.

When a position P (X, Y) is given, for example, the tree structure is traced and the position is compared with the coordinates of the domain ((X0, Y0), (X1, Y1)) to be able to acquire a domain which satisfies $X0 \leq X \leq X1$ and $Y0 \leq Y \leq Y1$. Then, a real shot image registered in the acquired domain can be acquired. Further, in case of reproducing (rendering) a real shot images to construct virtual display space which is the faithful reproduction of a real world, virtual display space can be constructed by searching the image database in use of the viewpoint position and view direction for generating a view in the as the shooting position and shooting direction of real shot images.

In a case of reproducing an omnidirectional real shot image as viewed from one position, there may be a case where real shot images in all directions are not registered in a domain including that position. In this case, if a real shot image in the shooting direction is registered in an adjoining domain, it is very likely that a similar image can be generated by using the real shot image instead. In this case, an image in an adjoining domain can be acquired by a clear search rule by managing data with a quadtree structure.

For example, if a domain adjoining to the domain S-13 is divided uniformly, there are S-12, S-21, S-24, S-31, S-42, S-41, S-14 and S-11 clockwise (see FIG. 4 with S-12, S-21, S-24, S-41 and S-42 supplemented). Since the division of a domain may not be performed uniformly, however, an upper-level domain becomes an adjoining domain when domains are not managed based on the tree structure. That is, S-2 is an adjoining domain for S-21 and S-24 while S-4 is an adjoining domain for S-42 and S-41.

The aforementioned search for an adjoining domain will be described referring to a method of expressing the label of a domain with a binary number. For normalized space with a lower left end being (0, 0) and an upper right end being (1, 1), quad-segmentation is executed recursively to divide a domain. When quad-segmentation is uniformly repeated n times, the domain is divided into $2^n \times 2^n$ domains. The coordinates of the lower left end and the upper right end of the domain in this case become $(k/2^n, j/2^n)$ and $((k+1)/2^n, (j+1)/2^n)$ respectively where the positions k and j are integers with $0 \leq k, j < 2^n$. That is, the coordinates are identified by three variables, the degree of division n, positions k and j. For example, as a binary label of a domain, (0, 0), (1,1), and (00,00) correspond to the domain IDs S-4, S-2, and (S-44), respectively.

Then, in case of uniform division, an adjoining domain to a domain $(k (1/2)^n, j (1/2)^n)$ can be acquired as follows.

An adjoining domain on the North side is expressed by $(k(1/2)^n, (j+1)(1/2)^n)$, as logn as $j<2^n-1$. When $j=2^n-1$, it is the northernmost domain with no adjoining domain.

An adjoining domain on the North East side is expressed by $((k+1)(1/2)^n, (j+1)(1/2)^n)$, $k<2^n-1$ and $j<2^n-1$. When $k=2^n-1$ or $j=2^n-1$, it is the northernmost or easternmost domain with no adjoining domain.

An adjoining domain on the East side is expressed by $((k+1)(1/2)^n, j(1/2)^n)$, $k<2^n-1$. When $k=2^n-1$, it is the easternmost domain with no adjoining domain.

An adjoining domain on the South East side is expressed by $(k(1/2)^n, (j-1)(1/2)^n)$, $k<2^n-1$. When $k=2^n-1$ or $j=0$, it is the southernmost or easternmost domain with no adjoining domain.

An adjoining domain on the South side is expressed by $(k(1/2)^n, (j-1)(1/2)^n)$, $j>0$. When $j=0$, it is the southernmost domain with no adjoining domain.

An adjoining domain on the South West side is expressed by $((k-1)(1/2)^n, (j-1)(1/2)^n)$, $k>0$ and $j>0$. When $k=0$ or $j=0$, it is the southernmost or westernmost domain with no adjoining domain.

An adjoining domain on the West side is expressed by $((k-1)(1/2)^n, j(1/2)^n)$, $k>0$. When $k=0$, it is the westernmost domain with no adjoining domain.

An adjoining domain on the North West side is expressed by $((k-1)(1/2)^n, (j+1)(1/2)^n)$, $k>0$ and $j<2^n-1$. When $k=0$ or $j=2^n-1$, it is the northernmost or westernmost domain with no adjoining domain.

Further, when an adjoining domain to the domain $(k(/2)^n, j (1/2)^n)$ is not divided uniformly and the degree of division is rough ($m \leq n$), the adjoining domain can be acquired as follows. It is to be noted however that int ( ) is a function of providing an integer value by rounding down after a decimal fraction.

An adjoining domain on the North side is expressed by $(int (k/2^{n-m})(1/2)^m, int((j+1)/2^{n-m})(1/2)^m)$, $j<2^n-1$. When $j=2^n-1$, it is the northernmost domain with no adjoining domain.

An adjoining domain on the North East side is expressed by $(int ((k+1)/2^{n-m})(1/2)^m, int (j/2)^{n-m})(1/2)^m)$, $k<2^n-1$ and $j<2^n-1$. When $k=2^n-1$ or $j=2^n-1$, it is the northernmost or easternmost domain with no adjoining domain.

An adjoining domain on the East side is expressed by $(int ((k+1)/2^{n-m})(1/2)^m, int (j/2)^{n-m})(1/2)^m)$, $k<2^n-1$. When $k=2^n-1$, it is the easternmost domain with no adjoining domain.

An adjoining domain on the South East side is expressed by $(int ((k+1)/2^{n-m})(1/2)^m, int ((j-1)/2)^{n-m})(1/2)^m)$, $k<2^n-1$ and $j>0$. When $k=2^n-1$ or $j=0$, it is the southernmost or easternmost domain with no adjoining domain.

An adjoining domain on the South side is expressed by $(int (k/2^{n-m})(1/2)^m, int((j-1)/2^{n-m})(1/2)^m)$, $j>0$. When $j=0$, it is the southernmost domain with no adjoining domain.

An adjoining domain on the South West side is expressed by $(int ((k-1)/2^{n-m})(1/2)^m, int ((j-1)/2)^{n-m})(1/2)^m)$, $k>0$ and $j>0$. When $k=0$ or $j=0$, it is the southernmost or westernmost domain with no adjoining domain.

An adjoining domain on the West side is expressed by $(int ((k-1)/2^{n-m})(1/2)^m, int (j/2)^{n-m})(1/2)^m)$, $k>0$. When $k=0$, it is the westernmost domain with no adjoining domain.

An adjoining domain on the North West side is expressed by $(int ((k-1)/2^{n-m})(1/2)^m, int ((j+1)/2)^{n-m})(1/2)^m)$, $k>0$ and $j<2^n-1$. When $k=0$ or $j=2^n-1$, it is the northernmost or easternmost domain with no adjoining domain.

Moreover, when an adjoining domain to the domain $(k (1/2)^n, j (1/2)^n)$ is not divided uniformly and the degree of division is fine ($m \geq n$), the adjoining domain can be acquired as follows. In case of North, East, South and West, a domain adjoins a plurality of domains with the same degree of division or different degrees of division, and when the degree of division of a domain with the finest degree of division being m, every s in $0 \leq s < 2^{m-n}$ is a target.

It is to be noted however that the degree of division differs from one adjoining domain to another, and when there is no m-segmented domains, an upper-level domain is used.

An adjoining domain on the North side is expressed by $((k \times 2^{m-n}+s)(1/2)^m, (j+1) \times 2^{m-n})(1/2)^m)$, $j<2^n-1$. When $j=2^n-1$, it is the northernmost domain with no adjoining domain.

An adjoining domain on the North East side is expressed by $((k+1) \times 2^{m-n})(1/2)^m, ((j+1) \times 2^{m-n})(1/2)^m)$, $k<2^n-1$ and $j<2^n-1$. When $k=2^n-1$ or $j=2^n-1$, it is the northernmost or easternmost domain with no adjoining domain.

An adjoining domain on the East side is expressed by $((k+1) \times 2^{m-n})(1/2)^m, (j \times 2^{m-n}+s)(1/2)^m)$, $k<2^n-1$. When $k=2^n-1$, it is the easternmost domain with no adjoining domain.

An adjoining domain on the South East side is expressed by $((k+1) \times 2^{m-n})(1/2)^m, (j \times 2^{m-n}-1)(1/2)^m)$, $k<2^n-1$ and $j>0$. When $k=2^n-1$ or $j=0$, it is the southernmost or easternmost domain with no adjoining domain.

An adjoining domain on the South side is expressed by $((k \times 2^{m-n}+s)(1/2)^m, (j \times 2^{m-n}-1)(1/2)^m)$, $j>0$. When $j=0$, it is the southernmost domain with no adjoining domain.

An adjoining domain on the South West side is expressed by $((k \times 2^{m-n}-1)(1/2)^m, (j \times 2^{m-n}-1)(1/2)^m)$, $k>0$ and $j>0$. When $k=0$ or $j=0$, it is the southernmost or westernmost domain with no adjoining domain.

An adjoining domain on the West side is expressed by $((k \times 2^{m-n}-1)(1/2)^m, (j \times 2^{m-n}+s)(1/2)^m)$, $k>0$. When $k=0$, it is the westernmost domain with no adjoining domain.

An adjoining domain on the North West side is expressed by $((k \times 2^{m-n}-1)(1/2)^m, ((j+1) \times 2^{m-n})(1/2)^m)$, $k>0$ and $j<2^n-1$. When $k=0$ or $j=2^n-1$, it is the northernmost or westernmost domain with no adjoining domain.

Figure 7:
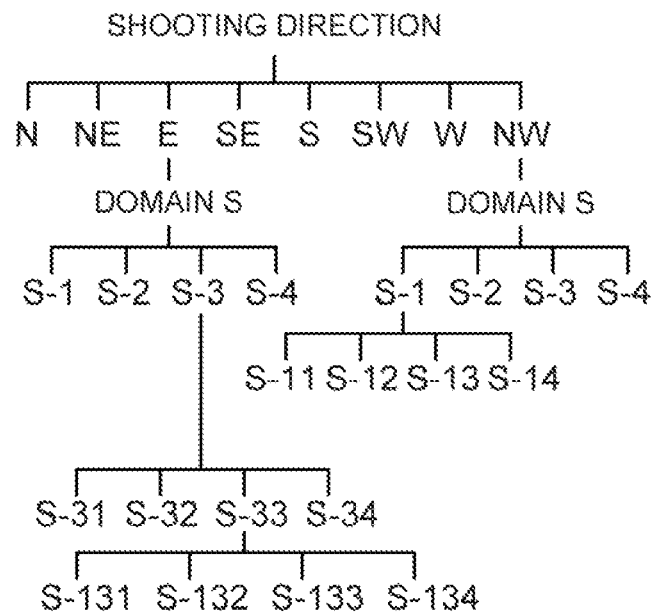
FIG. 7 is a diagram showing that domains are managed for each shooting direction.

FIG. 7 is a diagram showing that domains can be managed for each shooting direction. To register real shot images, domains are managed for each shooting direction. In this case, domains are constructed with a quadtree for each of eight shooting directions (N, NE, E, SE, S, SW, W, NW). If there are many cases where no image is present in one shooting direction, domain division in that direction need not be performed.

Figure 8:
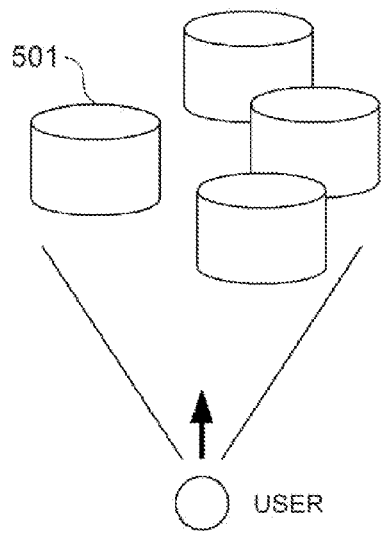
FIG. 8 is a diagram showing one example of external expressions of display space.
Figure 8:
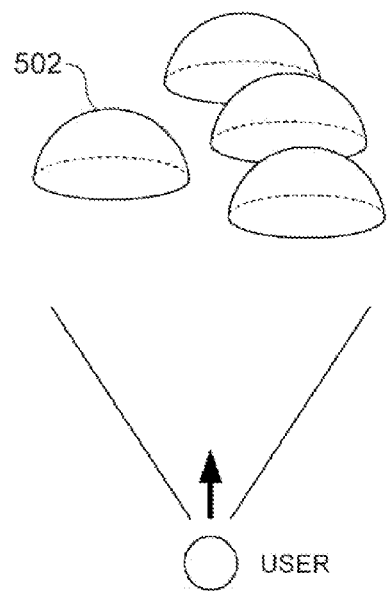
Figure 8:
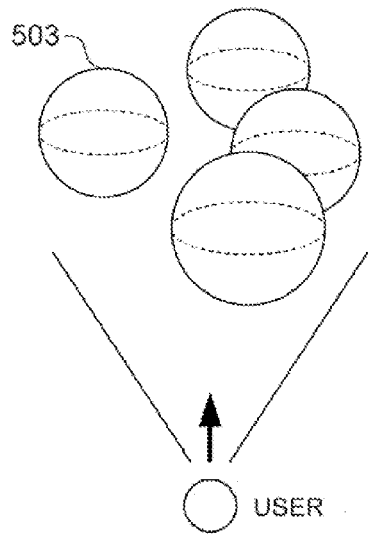
Figure 8:
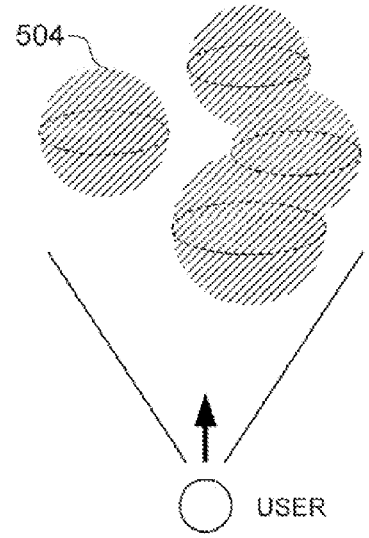

FIG. 8 is a diagram that shows one example of external expressions of display space, and shows where in virtual space the display space registered with real shot images is present.

In this embodiment, there are four modes in a case where a user views display space constituting virtual space from outside the display space. That is, typical external expressions of display space in the embodiment are a cylindrical shape, a semi-sphere, a sphere and a particle (cloud-like). Note that display space can be generated for one domain or can be generated from a plurality of domains (e.g., upper-level domains in the quadtree structure). In case of panoramic display, a panoramic image space determines a cylindrical shape, a semi-sphere or a sphere beforehand when an image is registered. As a way of expressing those display spaces, they can be rendered as a single shape with a single color, or one or a plurality of representative real shot images registered in the space can be subjected to texture mapping or the like.

FIG. 8(1) is a diagram showing a case where display space is a cylindrical shape 501. FIG. 8(2) is a diagram showing a case where display space is a semi-sphere 502. FIG. 8(3) is a diagram showing a case where display space is a sphere 503. FIG. 8(4) is a diagram showing a case where display space is a particle 504. Virtual space is constructed by those display spaces, and moves in the virtual space are achieved through moves in the display spaces.

Visible (transmittance of 0%), invisible (transmittance of 100%), and translucent are provided as a transparency which is one of display conditions for the display spaces. Visible means display of the display space; if a visible display space is present on the foreground, a display space of the background is hid and not visible, whereas if translucent display space is present on the foreground, a display space of the background is shown transparently. Invisible means that the display space is not displayed completely. Translucent permits display space on the background to be viewed transparently.

As a way of presenting translucent display, given that the intensity of light of an image on a fore plane is I1 and the intensity of light of an image on its rear side plane is I2, the intensity of light becomes I=αI2+(1−α)I1 where α (0≦α≦1.0) is transmittance. When α=1, it is complete transparency, and when α=0, it is incomplete transparency.

Methods of changing the display condition include parameter setting previously done by a user, parameter setting which is done by a command interactively, and parameter setting which is dynamically changed by the behavior of a user (context-awareness based parameter setting).

In the context-awareness based parameter setting, for example, the display condition is changed by a time for which a user is gazing. That is, when a user is gazing for a predetermined time or longer, the foreground display space which has been translucent is displayed more clearly as "visible". In the context-awareness based parameter setting, the display condition is changed in such a way that as a user moves, a visible display space is switched to fade in or fade out.

Internal expressions of display space, i.e., expressions in a case where a real shot image is moved inside display space where the image is rendered, and the rendered image is viewed there, include panoramic display, panel display on wall, panel display on focal distance, and mixed display of those display methods.

Panoramic display maps and displays real shot images on an inner plane of display space (cylindrical shape, semi-sphere, sphere, particle).

Panel display on wall displays images on the wall of display space by using multi-display techniques, such as overlaying and scrolling. That is, an image in a fore space among images in the view direction can be viewed.

Panel display on focal distance arranges and displays images at positions apart from the viewpoint position by shooting distances.

In the mixed display of those display methods, display methods are mixed based on the attributes of real shot images, the features of display space, and so forth to generate the interior of the display space.

Visible (transparency of 0%), invisible (transparency of 100%), and translucent are provided as a transparency which is one of display conditions for real shot images. Visible means display of a real shot image; if a visible real shot image is present on the foreground, the real shot image on the background is hid and not visible, whereas if a translucent real shot image is present on the foreground, the real shot image on the background is shown transparently. Invisible means that the real shot image is not displayed completely. Translucent permits a real shot image on the background to be viewed transparently. When a real shot image is not registered and is not therefore present, an image of "single plain color" under those display conditions is displayed instead.

For display conditions for real shot images, for example, setting of a shooting time (morning, evening, season or the like) is provided as attribute condition setting. The set shooting time can allow a real world for morning, daylight or night, or for each time to be faithfully reproduced. In addition, setting of display/non-display of an image in an adjoining domain is also provided. For display of an adjoining domain, setting to clearly indicate that an image displayed is from an adjoining domain is provided too. It is possible to inform a user of an image-unregistered domain and prompt the user to register an image. Further, setting of a shooting day, for example, is provided. Because a real shot image has a shooting date, if a shooting day to be reproduced is set, for example, a past state can be reproduced with real shot images on or before the set shooting day even if the real world is updated by construction of a new building or the like.

The display conditions for real shot images are changed by parameter setting previously done by a user, parameter setting which is done by a command interactively, and parameter setting which is dynamically changed by the behavior of a user (context-awareness based parameter setting).

In the context-awareness based parameter setting, for example, the display condition is changed by a time for which a user is gazing. That is, when a user is gazing for a given time or longer, the foreground display space which has been translucent is displayed more clearly as "visible". In the context-awareness based parameter setting, the display condition is changed in such a way that as a user moves, visible display space is switched to fade in or fade out.

Figure 9:
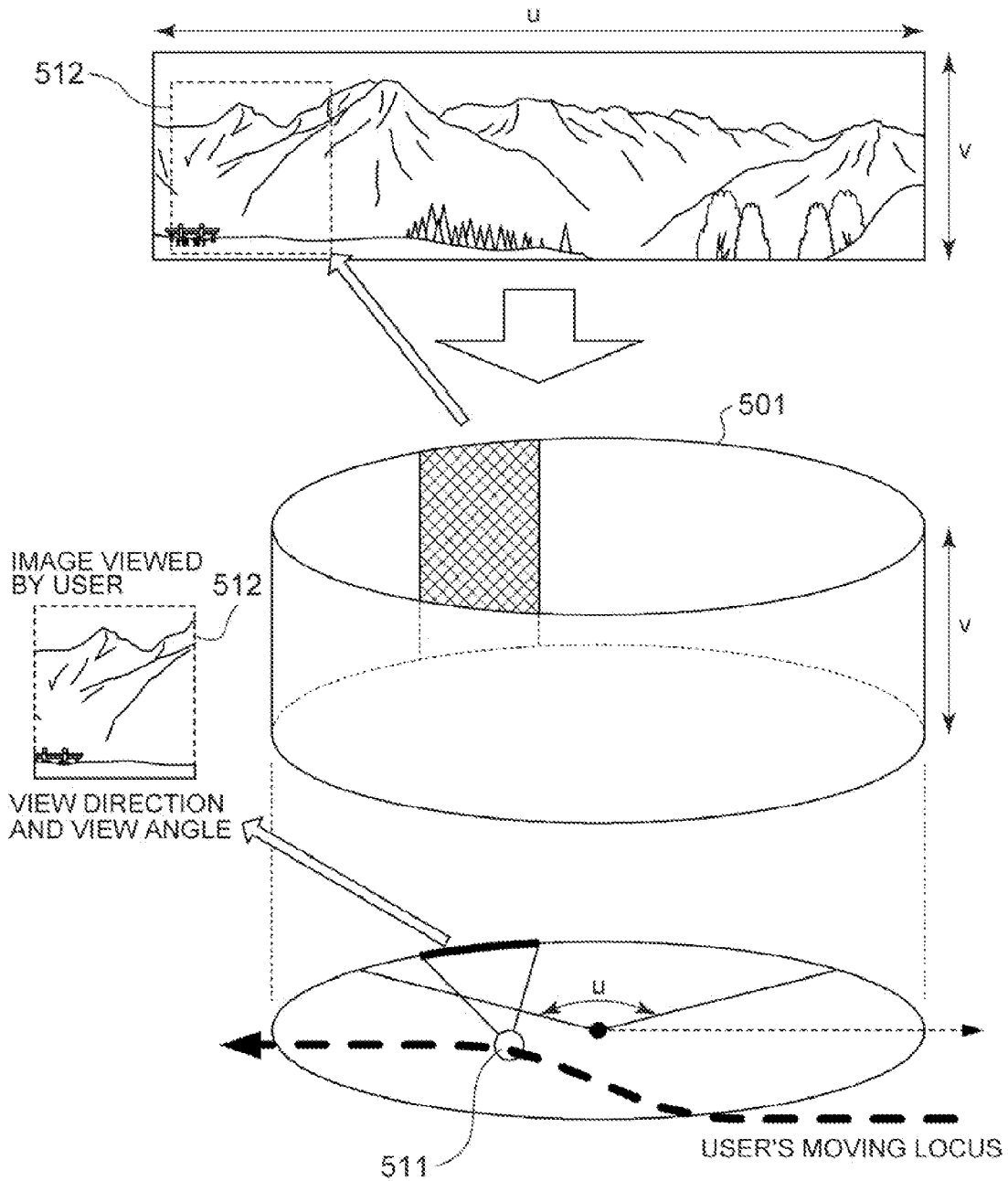
FIG. 9 is a diagram showing an example of panoramic image display.

FIG. 9 is a diagram showing an example of panoramic image display. For example, panoramic image display is enabled by mapping an image on an inner plane of a cylindrical shape. A user can view an image from inside the space. In FIG. 9, v indicates the height of display space and u indicates a view angle from the center of the display space. As the user moves, the user can see a part 512 of the mapped image from, for example, a viewpoint position 511 in the display space.

Figure 10:
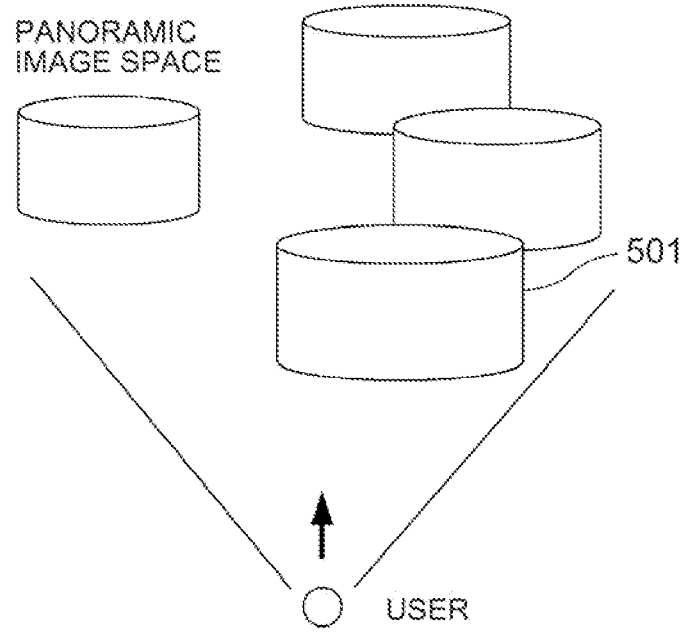
FIG. 10 is a diagram showing a virtual world created by real shot images.
Figure 10:
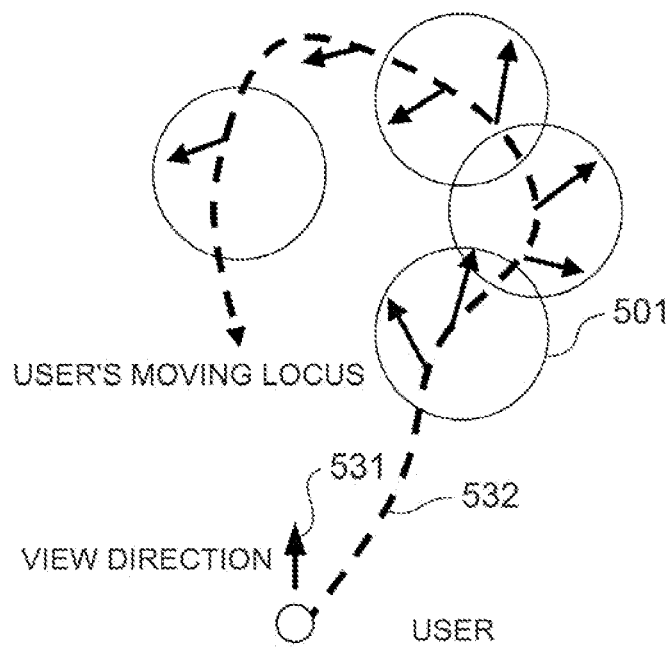

FIG. 10 is a diagram showing where in virtual space the display space possessing real shot image is present.

FIG. 10(1) is a diagram showing a case where display space constituting a virtual world is a cylindrical shape 501 as viewed from outside the display space. FIG. 10(2) is a diagram showing that a user moves in display space and is viewing the interior of the display space in a view direction 531. When a user enters panoramic display space (cylindrical shape, semi-sphere, sphere, particle), the user can see, for example, a panoramic image in the space and can feel a virtual world by moving around.

Figure 11:
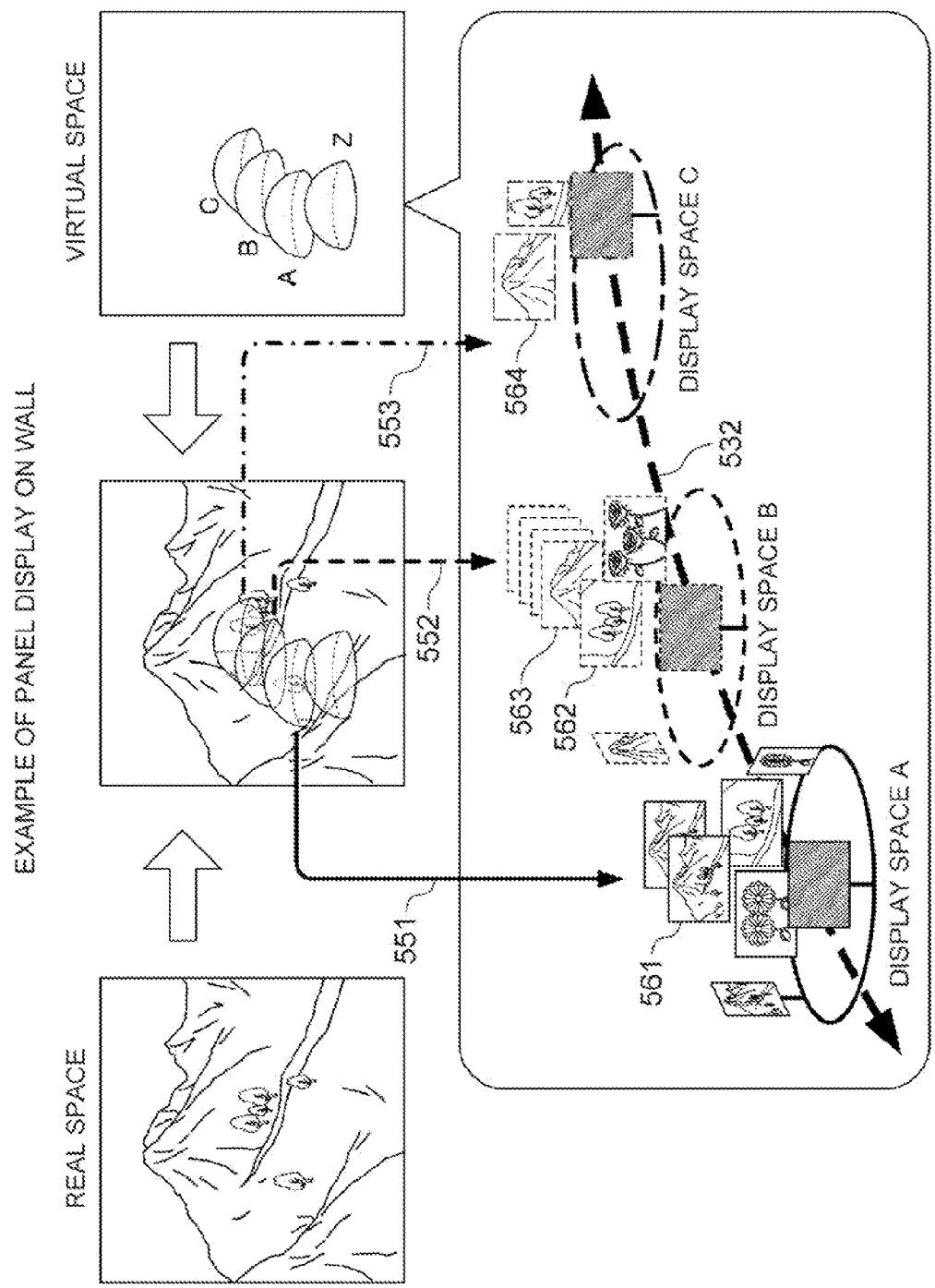
FIG. 11 is a diagram showing the concept of panel display on wall.

FIG. 11 is a diagram showing the concept of panel display on wall. A real shot image registered in a domain has information, such as a shooting position, shooting direction and shooting angle of elevation. A domain has a range defined by coordinates. Therefore, given that there is a wall of a semi-sphere in the range of the domain, a real shot image registered in a domain can be rendered by mapping the real shot image on the wall in the shooting direction.

In FIG. 11, arrow lines 551, 552 and 553 conceptually represent panel display on wall of photographs, taken while walking along the foot of a mountain in real space, on display spaces A, B and C of virtual space, respectively. As an avatar moves from the display space A to the display space B, then to the display space C along a broken line 532 through the panel display on wall to the display space, an image on the wall of the display space changes based on the position of the avatar. A far mountain 561 in the display space A becomes a mountain 563 having trees 562 on the foreground in the display space B, and becomes a landscape 564 near the summit in the display space C, so that the user can feel as if the user were actually moving, with the landscapes changing. Because images are rendered on the entire wall along the panel wall in the display space by using multi-display techniques, such as overlaying and scrolling, the user feels as if the user were in real space.

Figure 12:
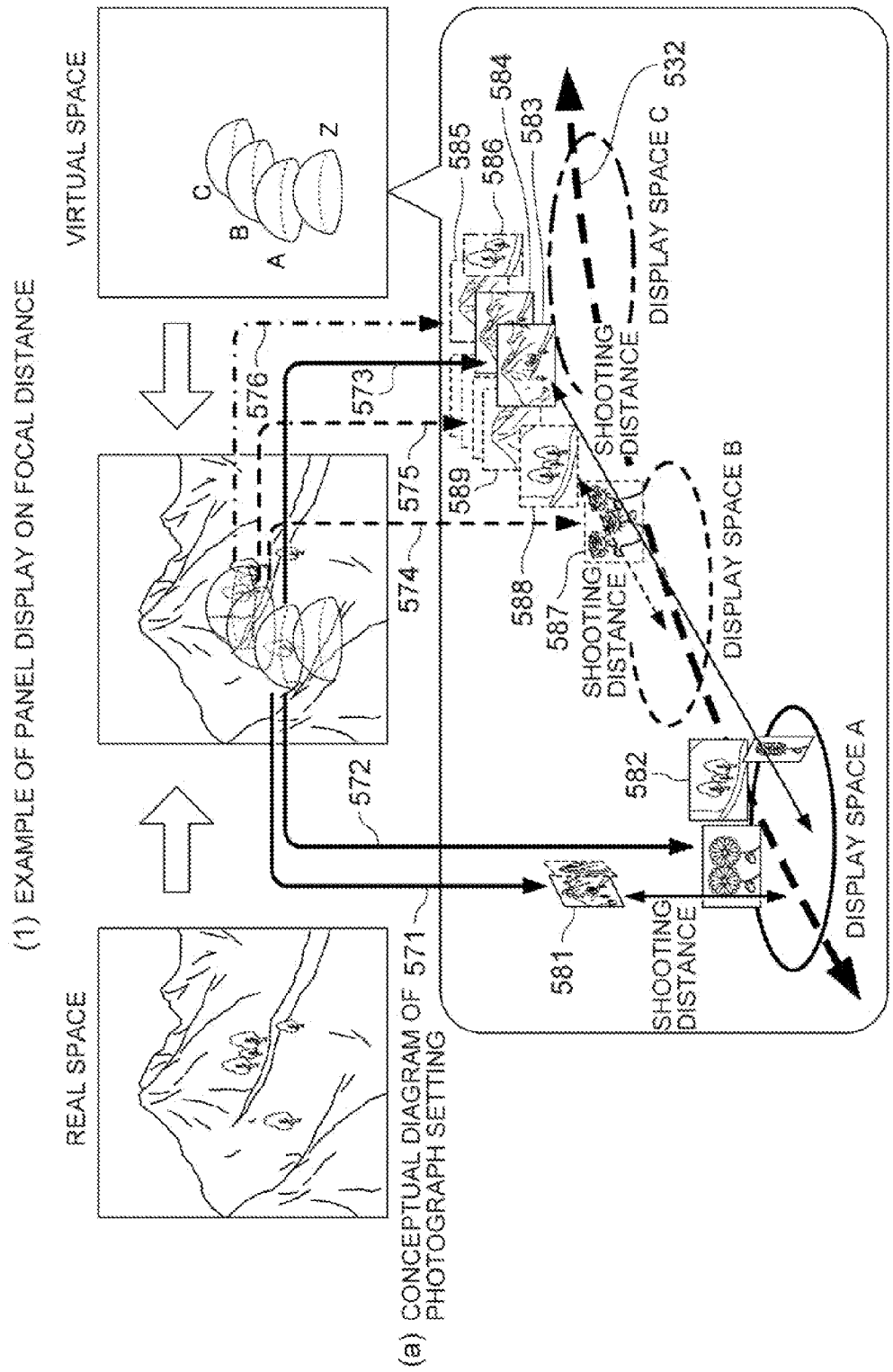
FIG. 12 is a diagram showing the concept of panel display on focal distance.

FIG. 12 is a diagram showing the concept of panel display on focal distance. A real shot image has information on a display distance in addition to a shooting position, shooting direction and shooting angle of elevation. Therefore, a real shot image registered in a domain which is acquired based on a viewpoint position can be rendered by mapping the real shot image on a wall assumed to exist at a distance according to the shooting distance from the viewpoint position in the display space.

In FIG. 12, arrow lines 571, 572 and 573 conceptually represent panel display on focal distance in the display space A, arrow lines 574 and 575 conceptually represent panel display on focal distance in the display space B, and an arrow line 575 conceptually represents panel display on focal distance in the display space C.

Figure 13:
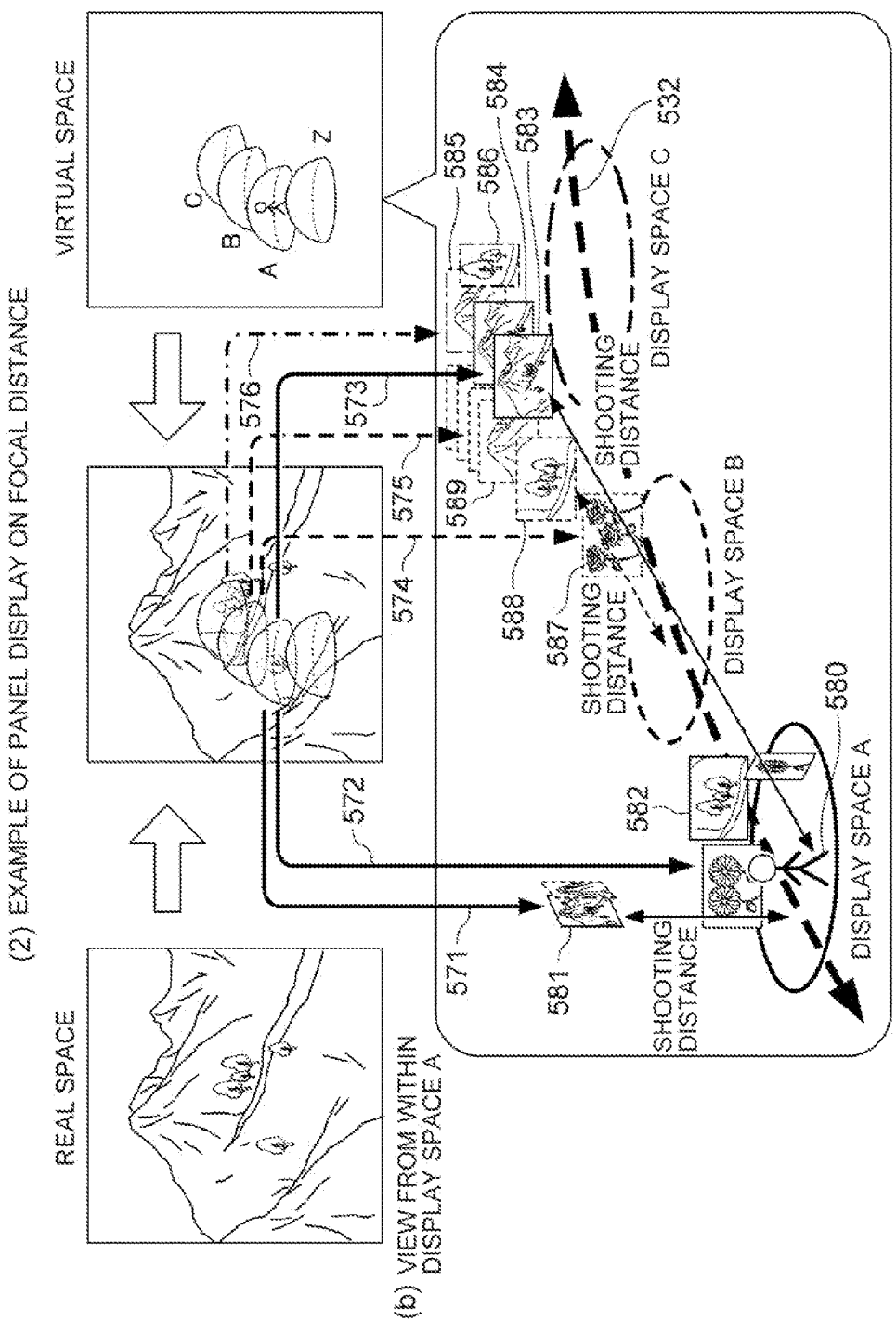
FIG. 13 is a diagram showing the concept of panel display on focal distance in the display space A.

FIG. 13 is a diagram showing the concept of panel display on focal distance in the display space A. As an avatar 580 moves to the display space A along the broken line 532 through the panel display on focal distance to the display space, panel display on focal distance to the display space A is presented based on the position of the avatar 580. As a result, a near mountain 581, near trees 582 and far mountains 583, 584 are viewed according to the shooting distance in the display space A.

Figure 14:
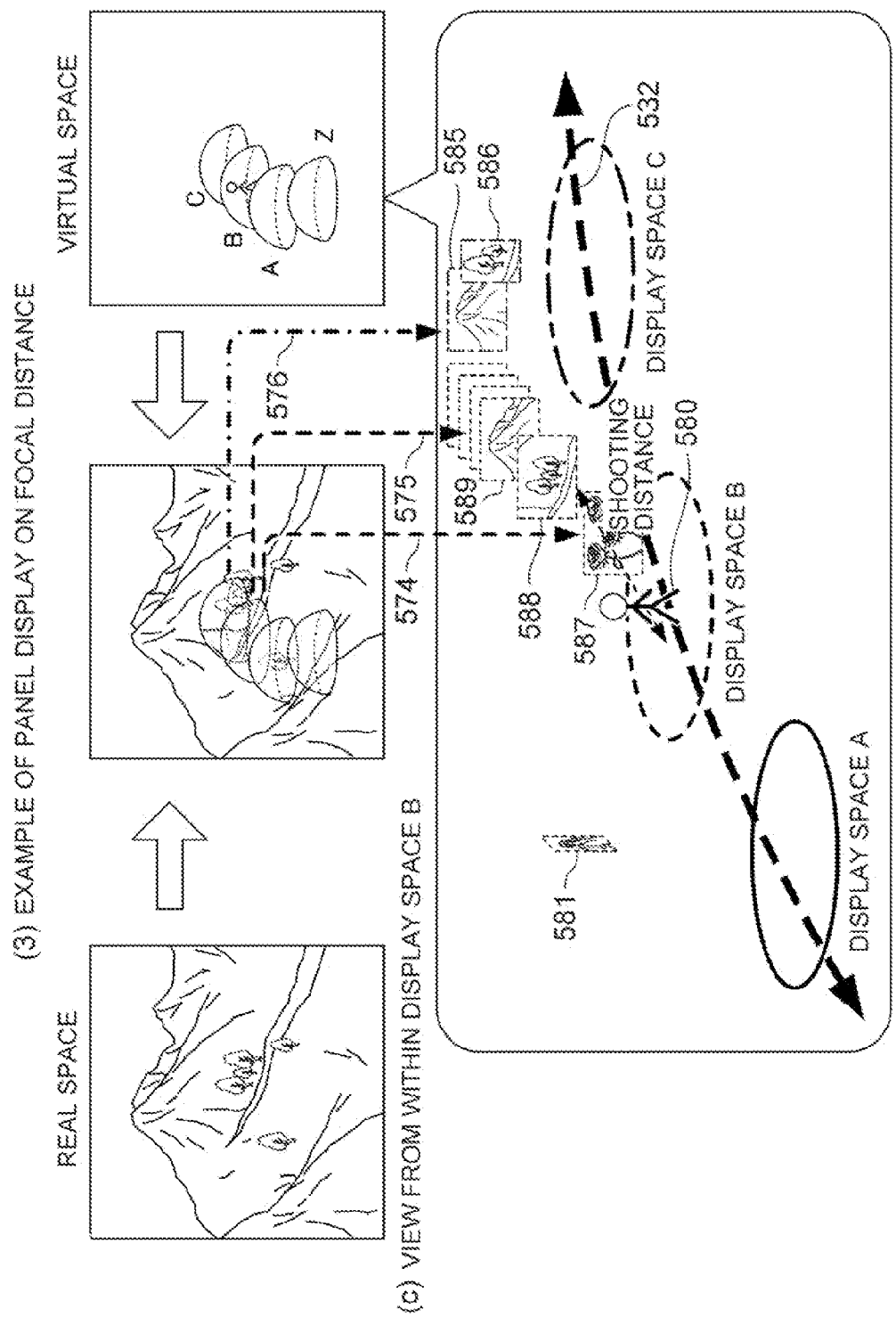
FIG. 14 is a diagram showing the concept of panel display on focal distance in the display space B.

FIG. 14 is a diagram showing the concept of panel display on focal distance in the display space B. As the avatar 580 moves to the display space B along the broken line 532 through the panel display on focal distance to the display space, panel display on focal distance to the display space B is presented based on the position of the avatar 580. As a result, near flowers 587, near trees 588, a near mountain 589, a far mountain 585 and far trees 586 are viewed according to the shooting distance in the display space B.

Figure 15:
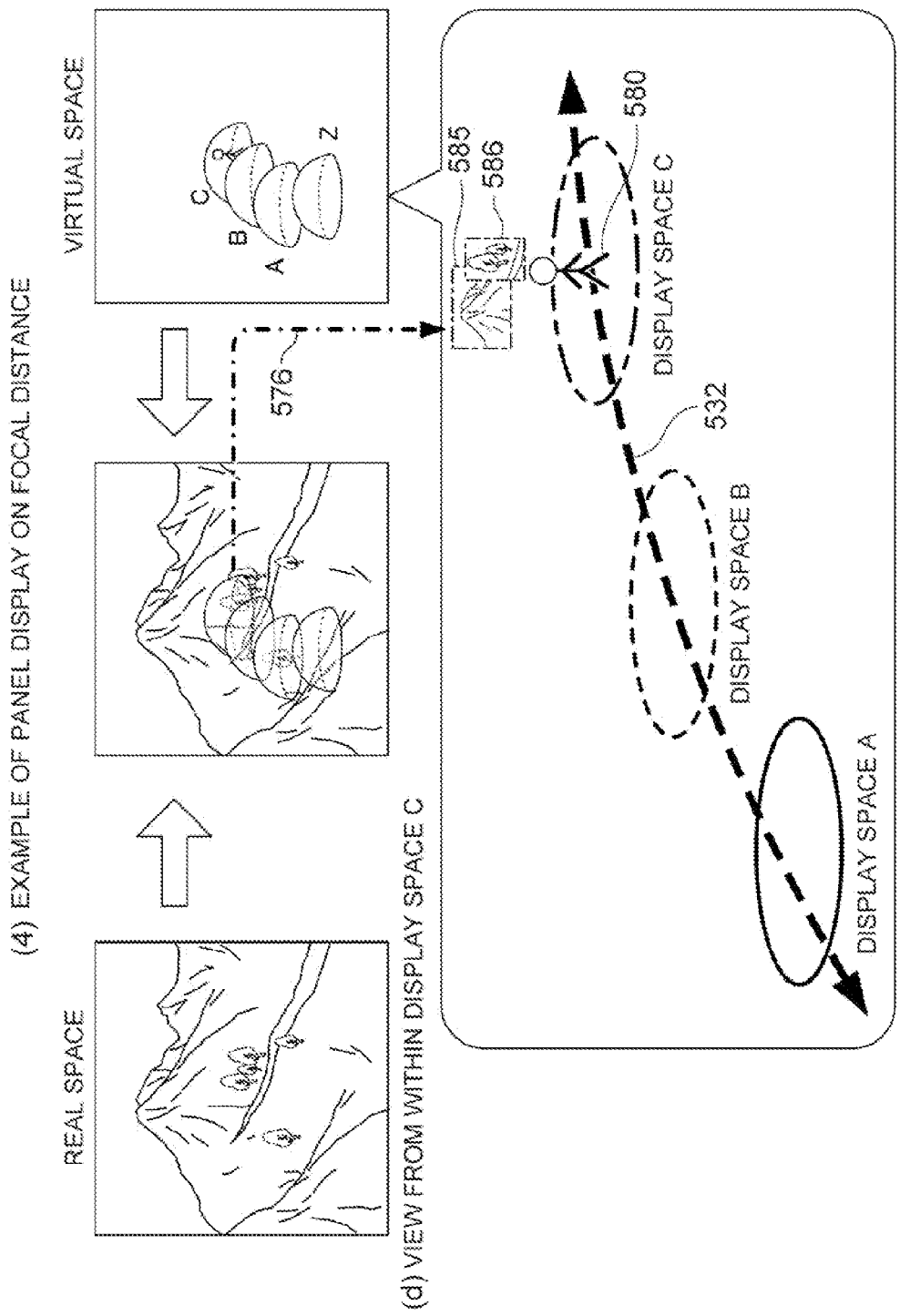
FIG. 15 is a diagram showing the concept of panel display on focal distance in the display space C.

FIG. 15 is a diagram showing the concept of panel display on focal distance in the display space C. As the avatar 580 moves to the display space C along the broken line 532 through the panel display on focal distance to the display space, panel display on focal distance to the display space C is presented based on the position of the avatar 580. As a result, a near mountain 585 and near trees 586 are viewed according to the shooting distance in the display space C.

FIGS. 16 to 20 are diagrams showing examples of a display method for real shot images.

Figure 16:
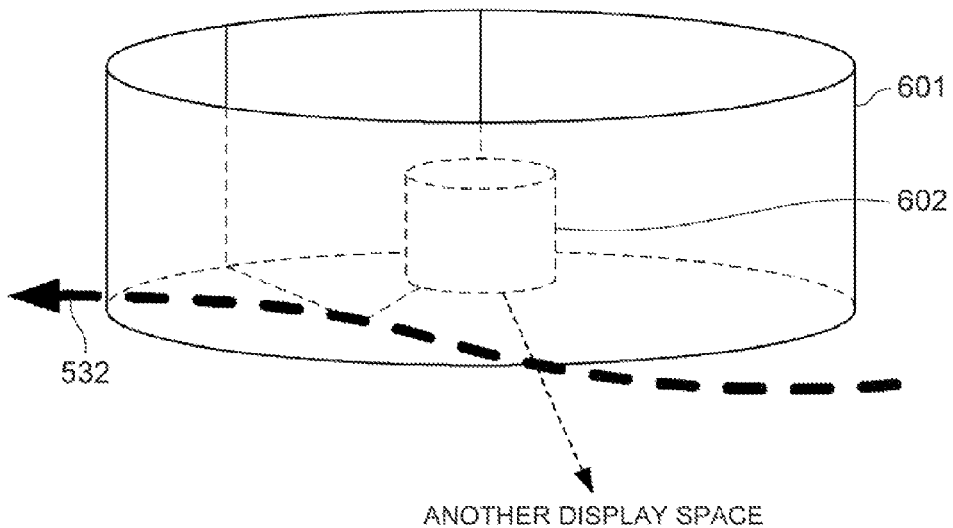
FIG. 16 is a diagram showing a display method when there is another display space included in display space.
Figure 16:
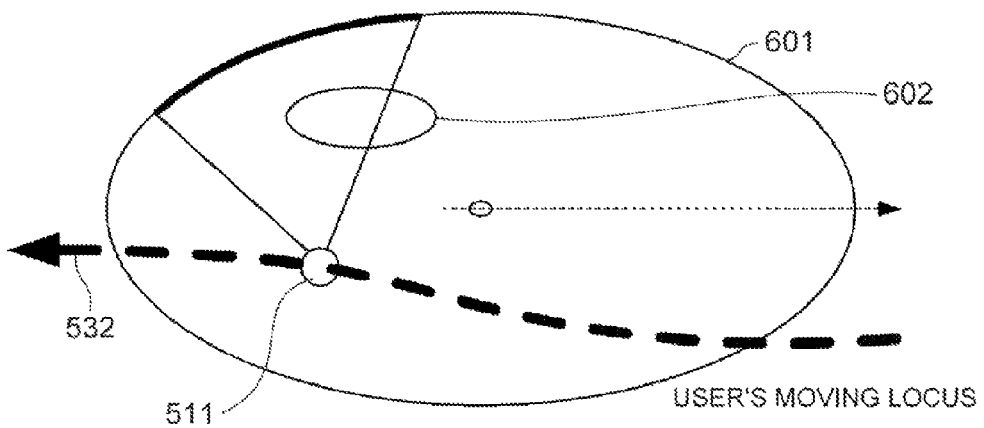

FIG. 16 is a diagram showing a display method when there is another display space included in display space. It is illustrated by way of example of a panoramic image. When another display space 602 included in display space 601 lies within the view angle of a user, the display space 602 is displayed under the display condition of visible, invisible, translucent or the like. If the included another display space 602 is displayed translucently and in context awareness mode, when the user gazes for a given time or longer, the display space 602 becomes invisible from translucent, clearly displaying the rear display space 601.

Figure 17:
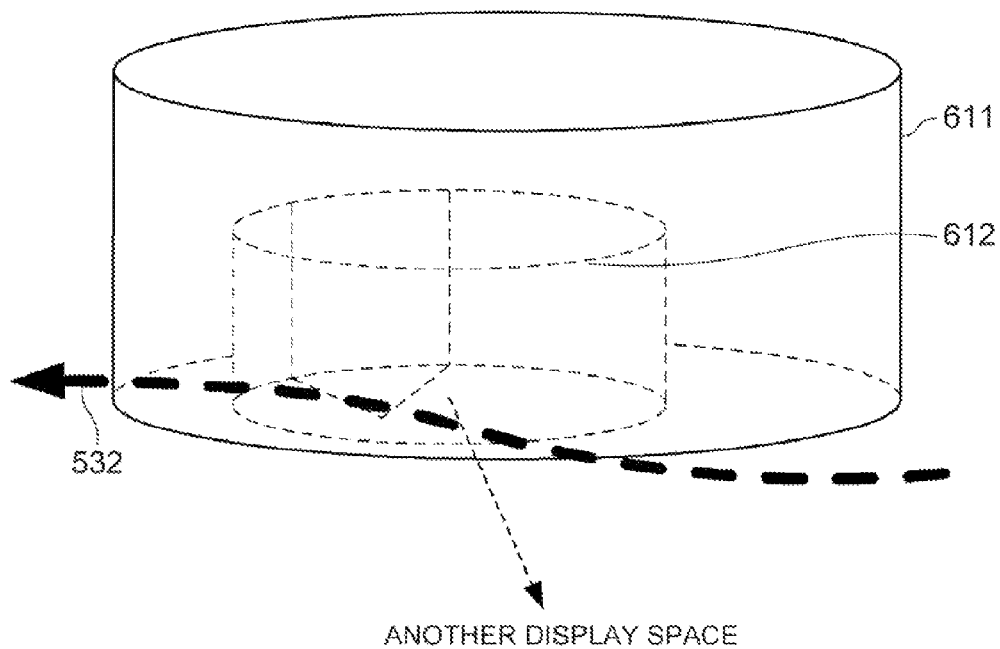
FIG. 17 is a diagram showing a display method when another display space is completely included in display space.
Figure 17:
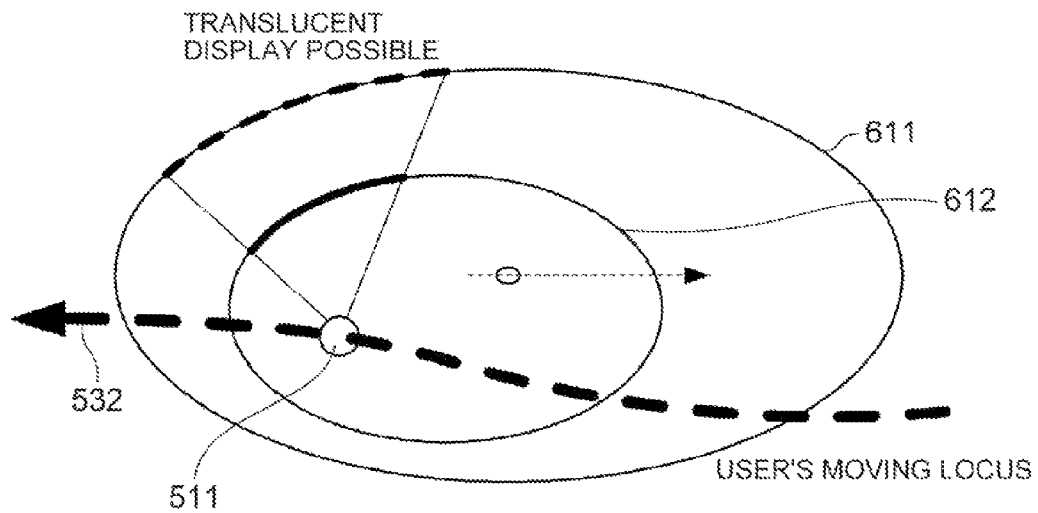

FIG. 17 is a diagram showing a display method when another display space is completely included in display space. It is illustrated by way of example of a panoramic image. When display space 602 where a user is present in display space is completely included in another display space 611, an image in the innermost display space 612 is displayed. The image in the display space 612 is displayed translucently, the rear display space 611 is seen through the display space 612, and in context awareness mode, when the user gazes for a given time or longer, the display of an image in the fore display space 612 is becomes clearly visible from the translucent state.

Figure 18:
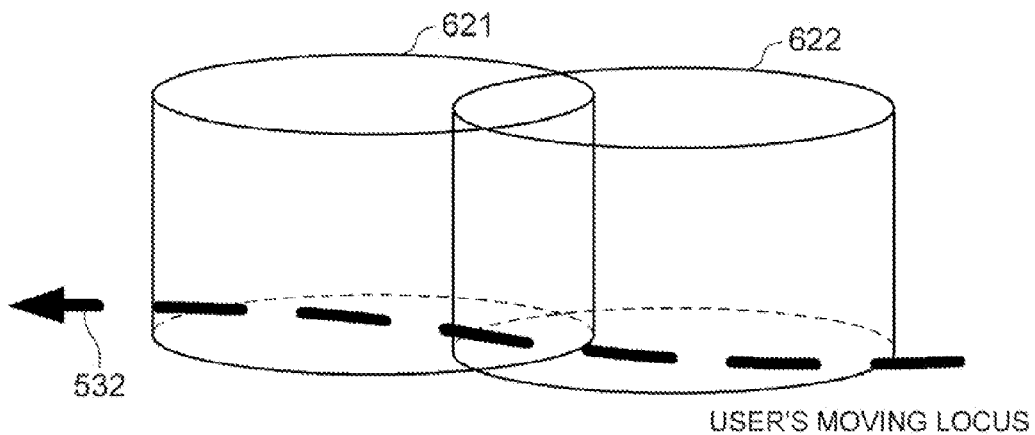
FIG. 18 is a diagram showing a display method when display space crosses another display space.
Figure 18:
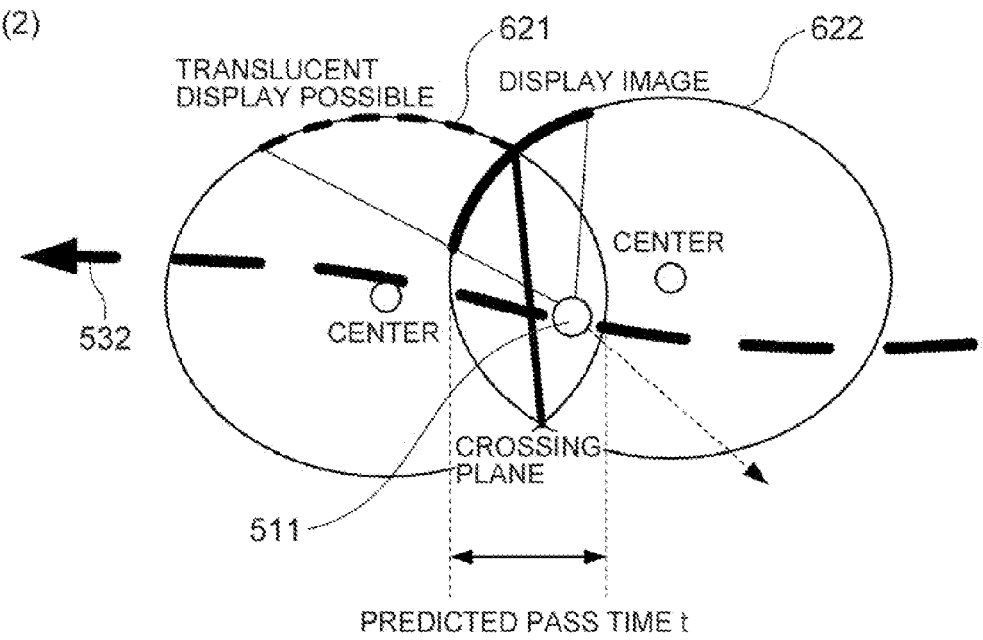

FIG. 18 is a diagram showing a display method when display space crosses another display space. It is illustrated by way of example of a panoramic image. When display space 621 and display space 622 cross each other, an image in display space which belongs to the center side of the cross plane of the display spaces is displayed. A display image may be displayed translucently to display an image in the other display space.

When the user moves between display spaces, it is possible to present display in such a way that a fore image fades out and a rear image is the next space fades in according to a predicted pass time t. When the cross area is large, image switching between fade-in and fade-out may be executed only in the area at the center portion of the cross area (cross center area), not over the entire cross area. Further, when the cross area is large, at the time of switching an image at the cross plane or image switching of fade-in/fade-out of the screen in the cross center area, setting a buffer domain or introducing fade-in/fade-out of the screen in the cross center area, setting a buffer domain or introducing fade-in/fade-out with a hysteresis characteristic can suppress a hypersensitive screen change at the time of zig-zag movement or fluctuation thereof.

Figure 19:
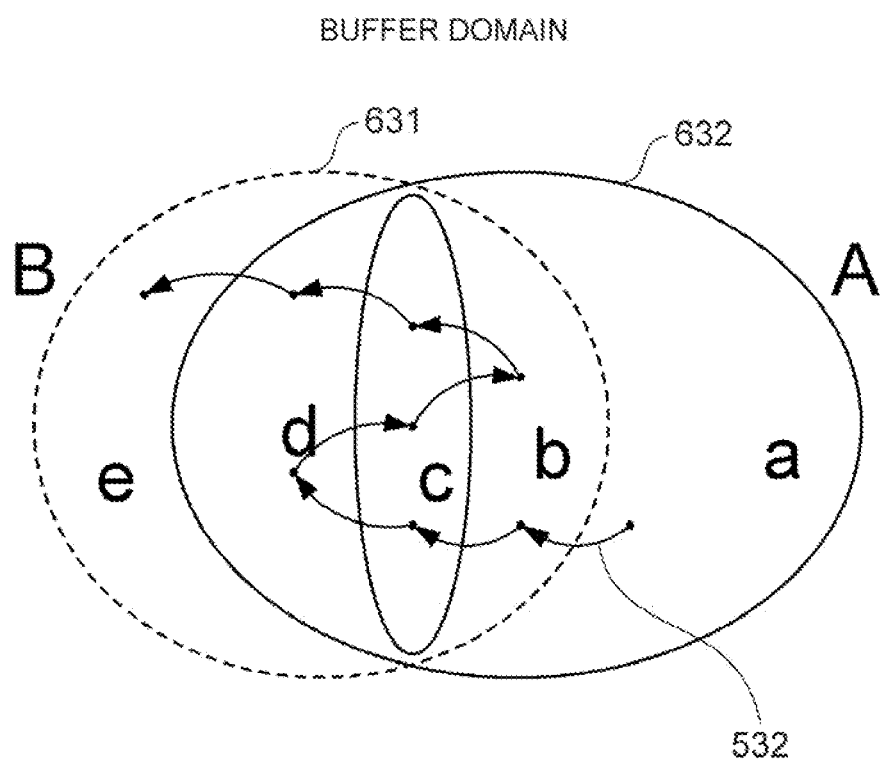
FIG. 19 is a diagram showing a display method when display spaces cross each other and an avatar moves.

FIG. 19 is a diagram showing a display method when display spaces cross each other and a user moves. A buffer domain c is provided between display spaces, and images between display spaces are switched with the buffer domain c being the boundary, in which a previous image is displayed according to the moving direction. Assuming that the user moves from a to b, and then moves from b to the buffer domain c, for example, because of the movement to the buffer domain c from the display space A, the display image in the buffer domain c becomes an image displayed in the previous display space A. Then, with the movement from the buffer domain c to d, the display image at d becomes an image in the display space B. When the user moves like a->b->c->d->c->b->c->d->e, a world to be displayed changes like A->A->A->B->B->A->A->B->B. In the buffer domain c, an image A or B of a previous world is displayed.

Figure 20:
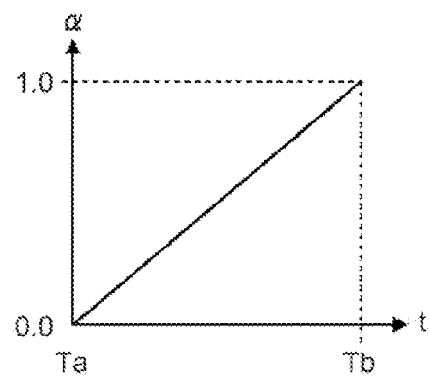
FIG. 20 is a diagram showing the hysteresis of fade-in/fade-out.
Figure 20:
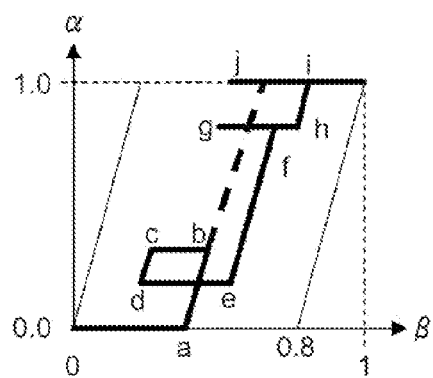
Figure 20:
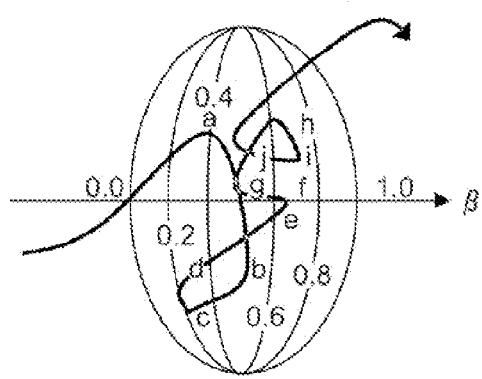

FIG. 20 is a diagram showing the hysteresis of fade-in/fade-out. In fade-in/fade-out, the transmittance a is given by a function α(t) of time t.

FIG. 20(1) is a diagram representing a case where, for example, α(t) changes linearly with respect to time t. FIG. 20(2) is a diagram showing the relationship between α and β when the transmittance α is given by a function α(β) of a spatial moving rate β. For example, α(β) represents a change in transmittance α when a continuous increase or decrease in moving rate is ½ of the buffer range and linearly changes in the range of 20 percent of the moving rate β. FIG. 20(3) is a diagram showing the spatial moving rate β of moving in the buffer domain in the case of FIG. 20(2). The spatial moving rate β shows 0.4 at a, 0.5 at b, 0.2 at c, 0.2 at d, 0.6 at e, 0.65 at f, 0.5 at g, 0.6 at h, 0.7 at i, and 0.5 at j. Therefore, the transmittance α in FIG. 20(2) shows 0.0 at a, 0.2 at b, 0.2 at c, 0.1 at d, 0.1 at e, 0.9 at f, 0.9 at g, 0.9 at h, 1.0 at i and 1.0 at j.

Referring to FIGS. 21 to 33, the following will describe an embodiment of a system of storing a real shot image and rendering the real shot image in display space which constitutes virtual space based on the stored real shot image. In this embodiment, an image database device 1 has data receiving means 1040, image storing means (data structure of image information to be explained referring to FIG. 24, hard disk 1074), domain storage means (data structure of domain information to be explained referring to FIG. 25, hard disk 1074), registration storing means (pointer to an image of domain information to be explained referring to FIG. 25, hard disk 1074), determining means (step S115 in FIG. 27), domain dividing means (step S116 in FIG. 27), and control means (image registering process in FIG. 27). The image database device 1 further has data receiving means 2040, accepting means (step S202 in FIG. 29), image acquiring means (step S224 in FIG. 31), control means (main process in FIG. 29), and display device 2022.

Figure 21:
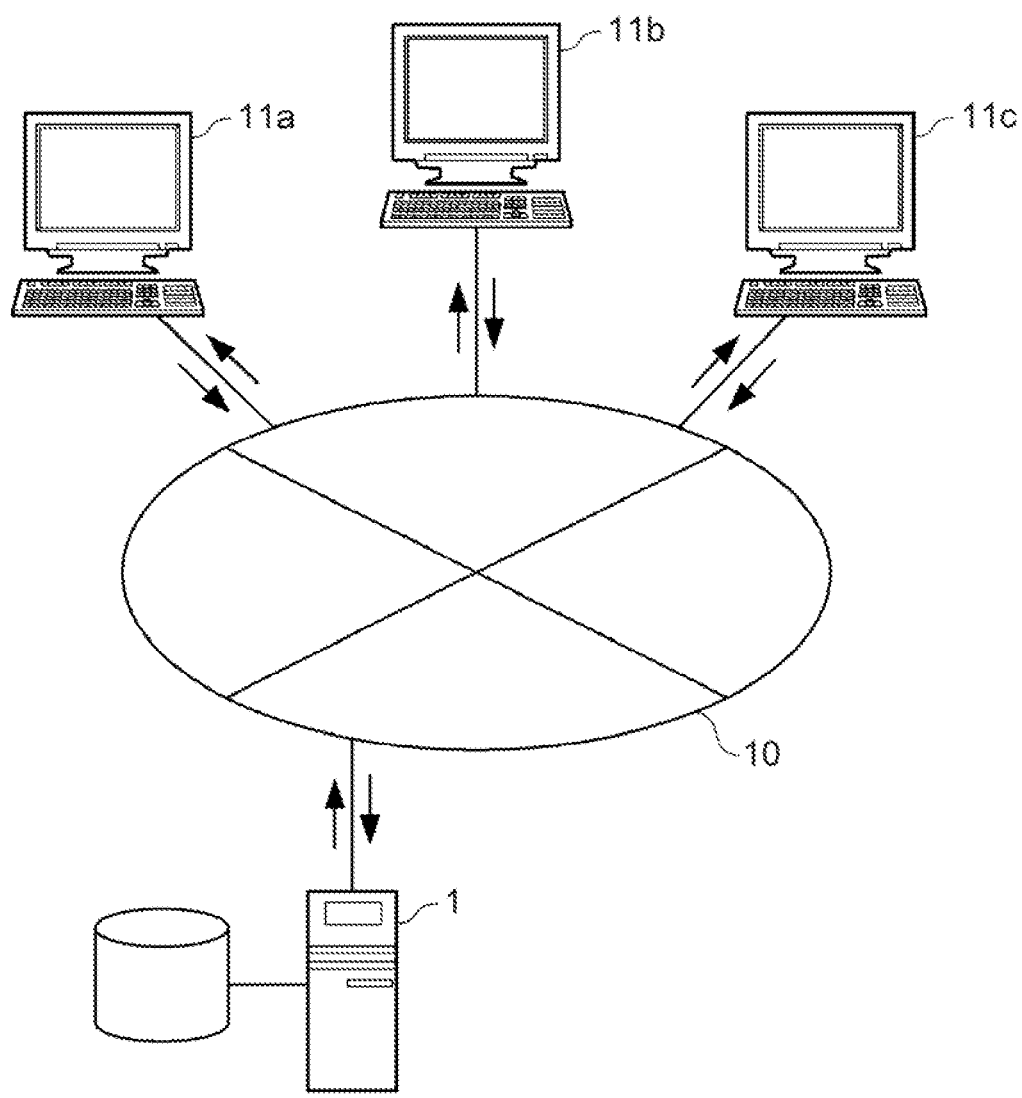
FIG. 21 is a diagram showing the operational environment of an image database device.

FIG. 21 is a diagram showing the operational environment of the image database device 1. It is illustrated that the image database device 1, and image processing units 11a, 11b, 11c are connected together over a network 10 (Internet, LAN, WAN or the like).

The image database device 1 stores a real shot image, transmitted over the network 10 from the image processing unit 11 based on a shooting position of the real shot image. The image processing unit 11 transmits the position of display to the image database device over the network 10, and receives a real shot image, retrieved based on the position, over the network 10, and displays the real shot image.

Figure 22:
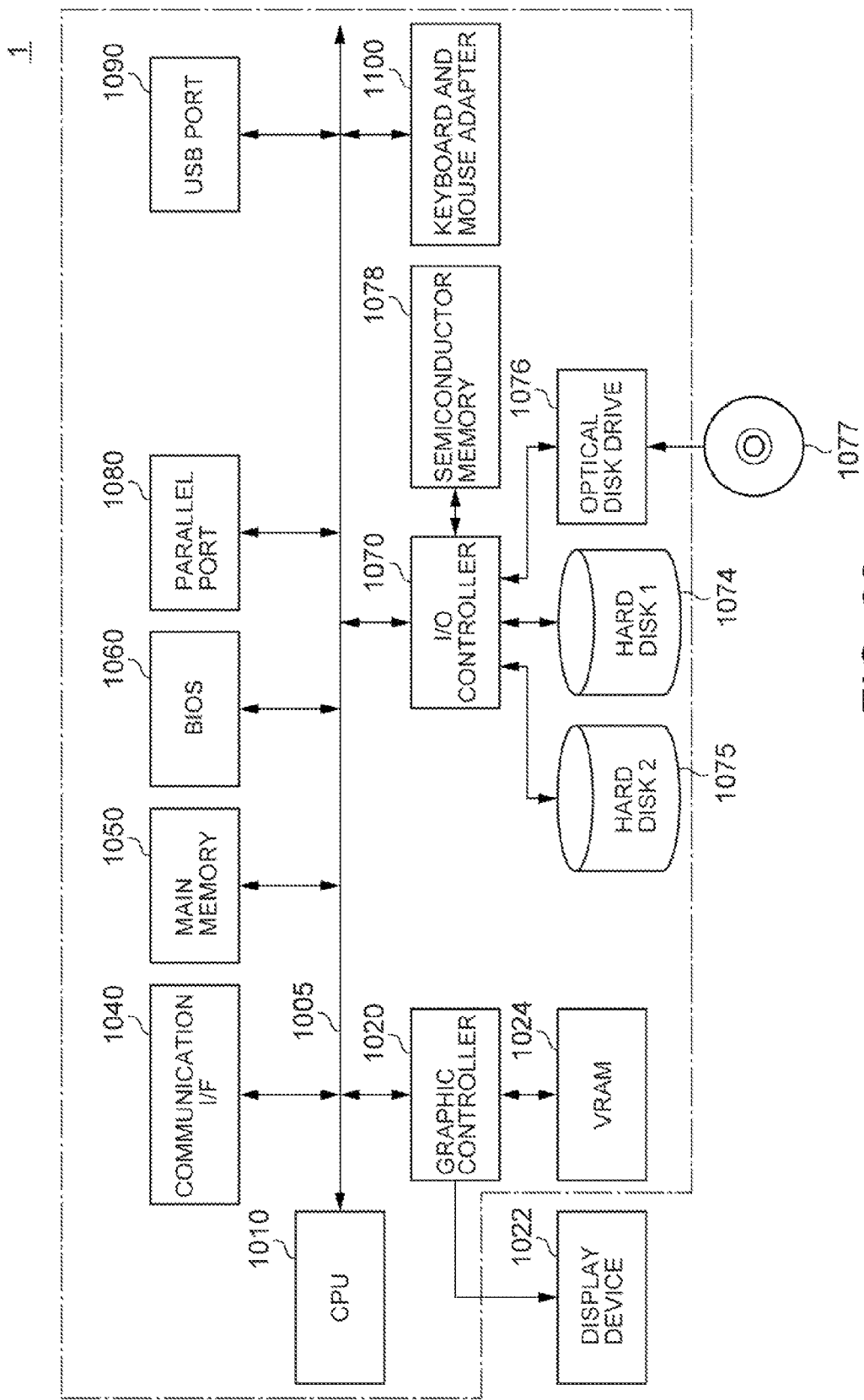
FIG. 22 is a diagram showing the hardware configuration of the image database device.

FIG. 22 is a diagram showing the hardware configuration of the image database device 1. While the following will describes the general configuration of the image processing unit typified by a computer, it is needless to say that the minimum configuration necessary can be selected according to the environment in case of an exclusive machine or an install type device.

The image database device 1 has a CPU (Central Processing Unit) 1010, a bus line 1005, a communication I/F 1040, a main memory 1050, a BIOS (Basic Input Output System) 1060, a parallel port 1080, a USB port 1090, a graphic controller 1020, a VRAM 1024, an I/O controller 1070 and input means such as a keyboard and mouse adapter 1100. The I/O controller 1070 can be connected with storing means, such as a hard disk 1074 and a backup hard disk 1075, an optical disk drive 1076 and a semiconductor memory 2078. A display device 1022 is connected to the graphic controller 1020.

The BIOS 1060 stores a boot program which is executed by the CPU 1010 when the image database device 1 is activated, a program which depends on the hardware of the image database device 1, etc.

As the optical disk drive 1076, for example, a DVD-ROM drive, a CD-ROM drive, a DVD-RAM drive or a CD-RAM drive can be used. At this time, an optical disk 1077 compatible with each drive needs to be used. The optical disk drive 1076 can read a program or data from the optical disk 1077, and can provide the main memory 1050 or the hard disk 1074 with it over the I/O controller 1070.

A computer program which is provided to the image database device 1 is stored in a recording medium, such as a flexible disk 1071, the optical disk 1077 or a memory card, and is provided by a user. The computer program is read from the recording medium via the I/O controller 1070 or is downloaded via the communication I/F 1040 to be installed in and executed by the image database device 1. Because the operation that the computer program causes the image processing unit to perform is the same as the operation of the device already described, it will be omitted.

The computer program may be stored in an external storage medium. As the storage medium, a magnetooptical recording medium like MD, and a tape medium in addition to the flexible disk 1071, the optical disk 1077 or a memory card. A storage device, such as a hard disk or an optical disk library, provided in a server system connected to a private communication circuit or the Internet may be used as a recording medium, or the computer program may be provided to the image database device 1 via a communication circuit.

Figure 23:
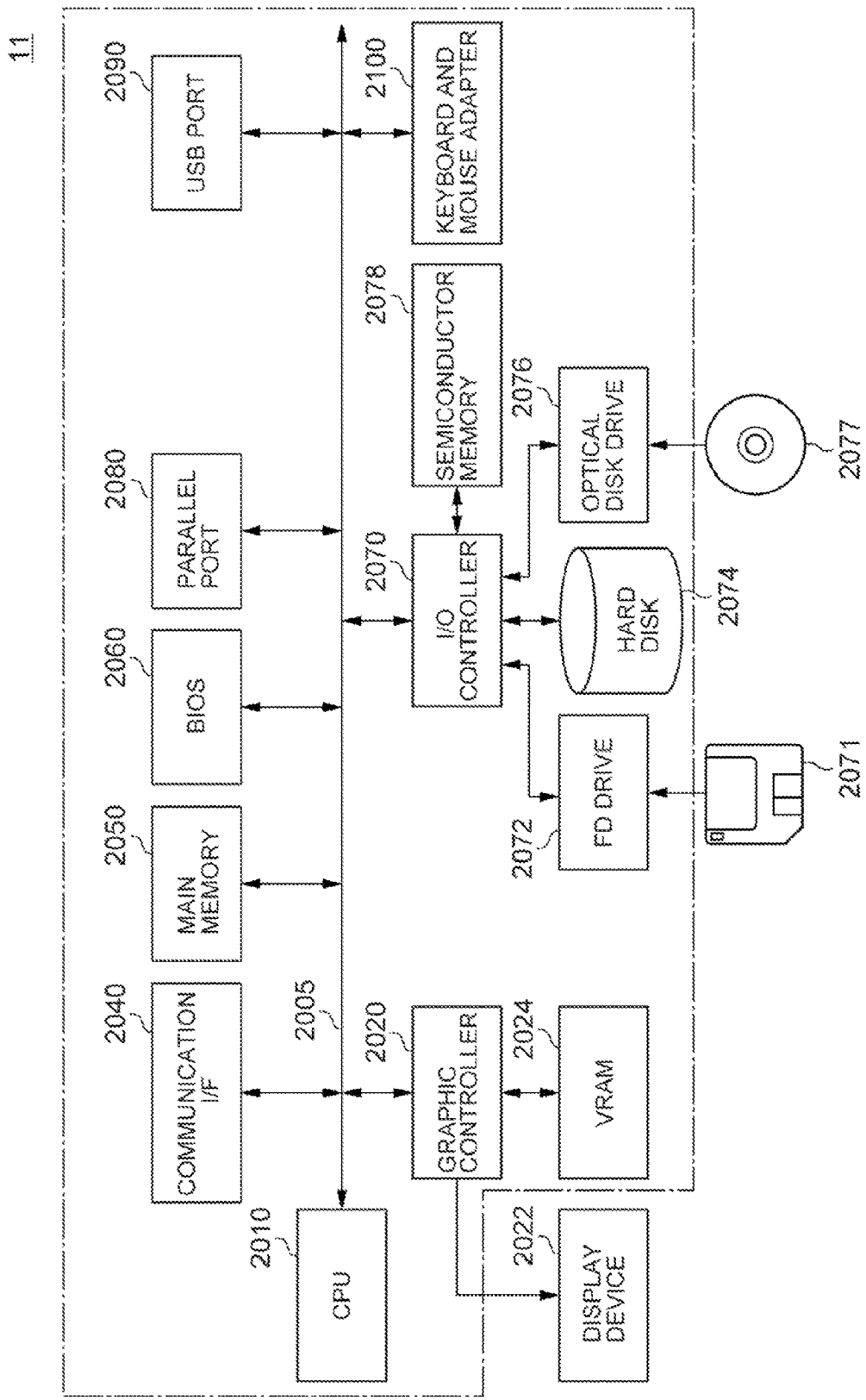
FIG. 23 is a diagram showing the hardware configuration of an image processing unit.

FIG. 23 is a diagram showing the hardware configuration of the image processing unit 11. While the following will describes the general configuration of the image processing unit typified by a computer, it is needless to say that the minimum configuration necessary can be selected according to the environment in case of an exclusive machine or an install type device.

The image processing unit 11 has a CPU (Central Processing Unit) 2010, a bus line 2005, a communication I/F 2040, a main memory 2050, a BIOS (Basic Input Output System) 2060, a parallel port 2080, a USB port 2090, a graphic controller 2020, a VRAM 2024, an I/O controller 2070 and input means such as a keyboard and mouse adapter 1100. The I/O controller 2070 can be connected with storing means, such as a flexible disk (FD) drive 2072, a hard disk 2074, an optical disk drive 2076 and a semiconductor memory 2078. A display device 2022 is connected to the graphic controller 2020.

The BIOS 2060 stores a boot program which is executed by the CPU 2010 when the image processing unit 11 is activated, a program which depends on the hardware of the image processing unit 11, etc.

As the optical disk drive 2076, for example, a DVD-ROM drive, a CD-ROM drive, a DVD-RAM drive or a CD-RAM drive can be used. At this time, an optical disk 2077 compatible with each drive needs to be used. The optical disk drive 2076 can read a program or data from the optical disk 2077, and can provide the main memory 2050 or the hard disk 2074 with it over the I/O controller 2070.

A computer program which is provided to the image processing unit 11 is stored in a recording medium, such as a flexible disk 2071, the optical disk 2077 or a memory card, and is provided by a user. The computer program is read from the recording medium via the I/O controller 2070 or is downloaded via the communication I/F 2040 to be installed in and executed by the image processing unit 11. Because the operation that the computer program causes the image processing unit to perform is the same as the operation of the device already described, it will be omitted.

The computer program may be stored in an external storage medium. As the storage medium, a magnetooptical recording medium like MD, and a tape medium in addition to the flexible disk 2071, the optical disk 2077 or a memory card. A storage device, such as a hard disk or an optical disk library, provided in a server system connected to a private communication circuit or the Internet may be used as a recording medium, or the computer program may be provided to the image processing unit 11 via a communication circuit.

Figure 24:
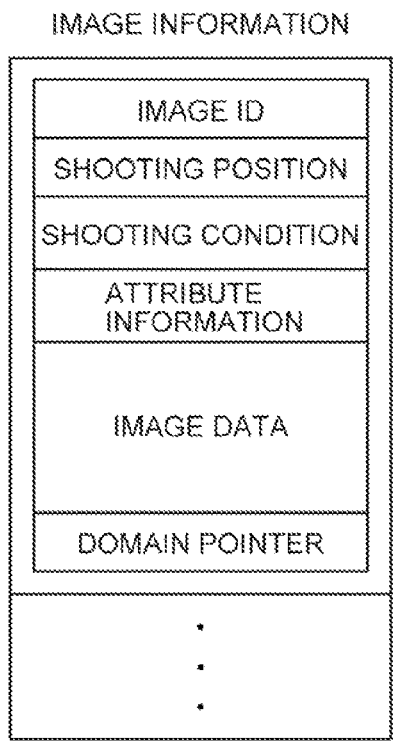
FIG. 24 is a diagram showing the data structure of image information.

FIG. 24 is a diagram showing the data structure of image information. Image information may have an image ID, shooting position data, other shooting conditions (shooting direction, shooting angle of elevation, etc.) data, attribute information (shooting date or the like) data, and a pointer to a domain, along with one piece of image data.

Figure 25:
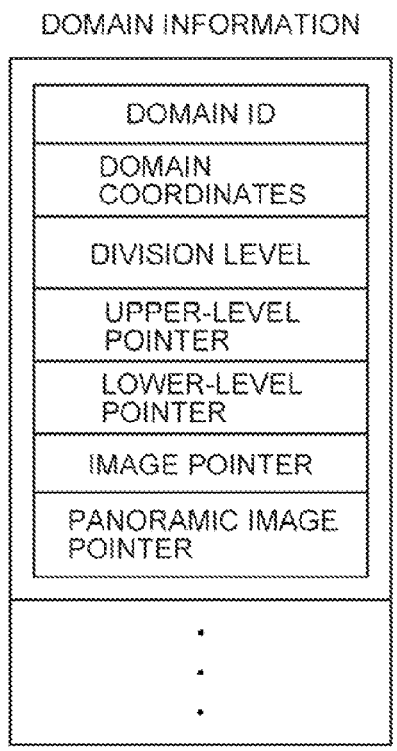
FIG. 25 is a diagram showing the data structure of domain information.

FIG. 25 is a diagram showing the data structure of domain information. An domain may have a domain ID, coordinates of the domain, a division level for a tree structure, a pointer to an upper-level node, pointers to an lower-level node, pointers to images, and a pointer to a panoramic image. The division level is the maximum number of division levels of the nodes in the domain. Each pointer to an image comprises pointers for its shooting direction, its shooting angle of elevation, its shooting time, etc. its real shot image is stored classified for each shooting direction, each shooting angle of elevation, each shooting time, etc.

Figure 26:
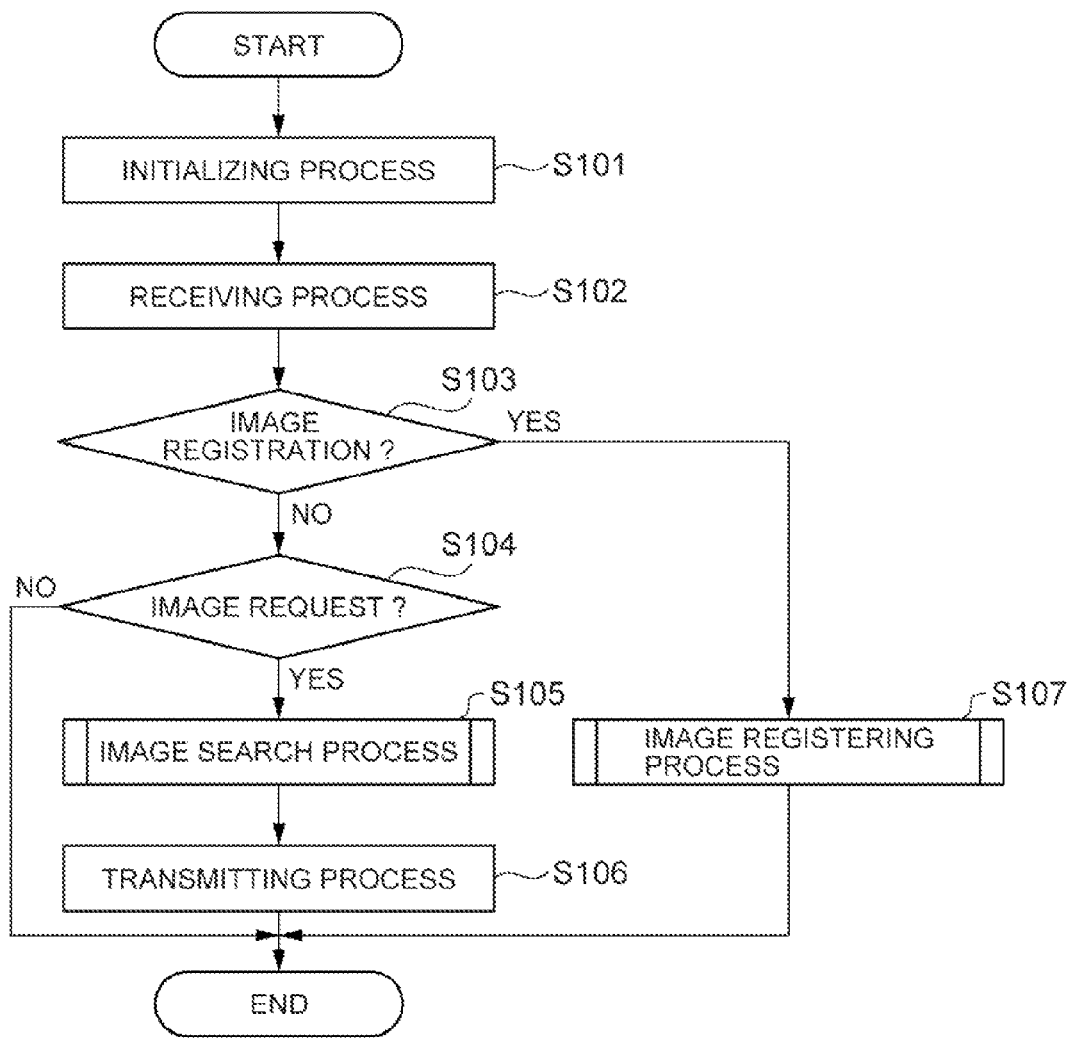
FIG. 26 is a main flowchart of the image database device.

FIG. 26 is a main flowchart of the image database device 1.

The CPU 1010 performs an initialization process in step S101, and moves the process to step S102. In step S102, the CPU 1010 performs a process of receiving data from the image processing unit 11 over the network 10, and moves the process to step S103 to determine whether the received data is to be subjected to image registration. When the determination is YES, the CPU 1010 moves the process to step S107, and when the determination is NO, the CPU 1010 moves the process to step S104. In step S104, the CPU 1010 determines whether the received data is an image request. When the determination is YES, the CPU 1010 moves the process to step S105, and when the determination is NO, the CPU 1010 terminates the process. In step S105, the CPU 1010 executes an image search process based on the received data, moves the process to step S106 to execute a process of transmitting the searched image data, then terminates the process.

In step S107, the CPU 1010 performs an image registering process, and terminates the process thereafter.

Figure 27:
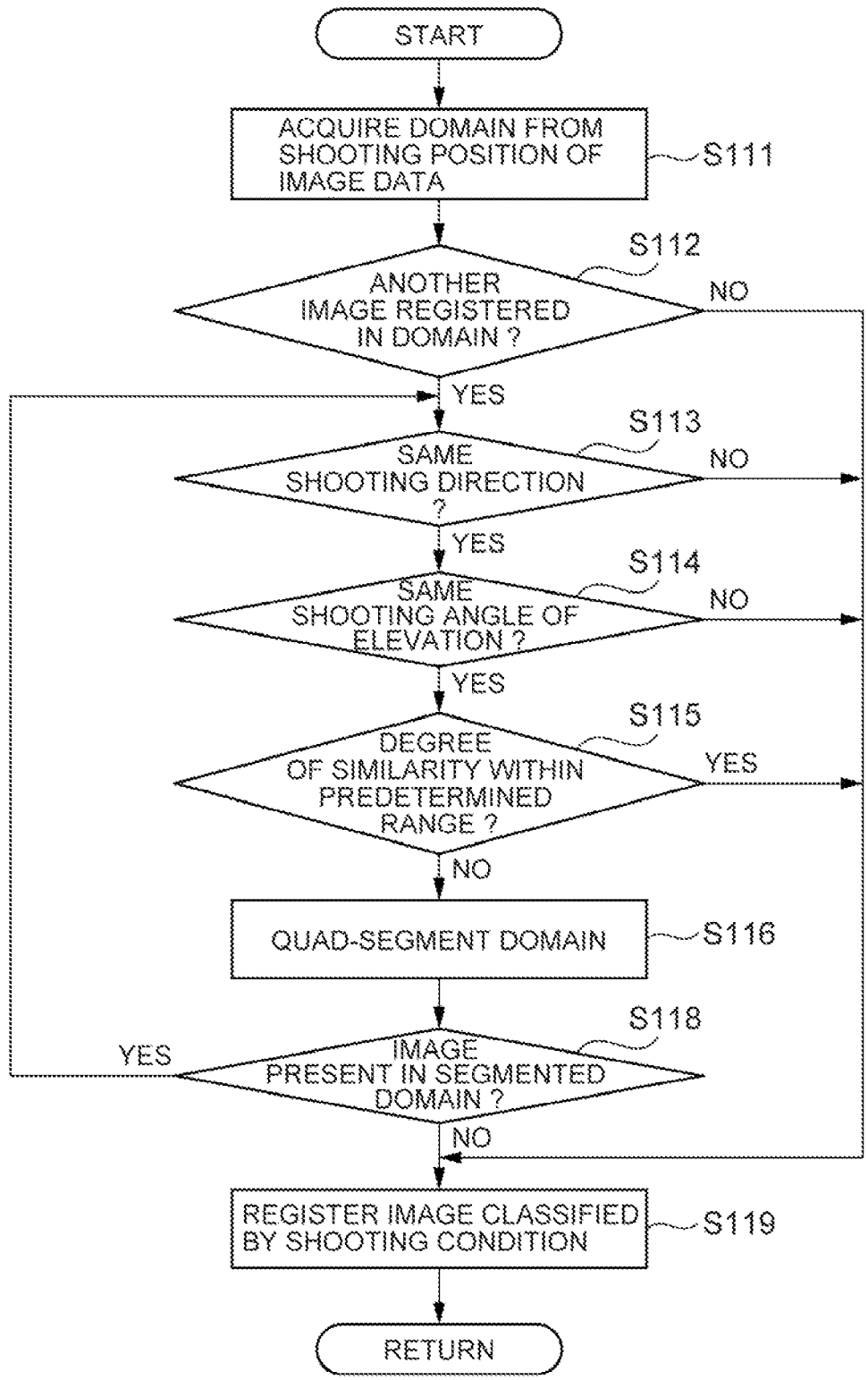
FIG. 27 is a flowchart of an image registering process of the image database device.

FIG. 27 is a flowchart of the image registering process of the image database device 1.

In step S111, the CPU 1010 acquires a domain from the shooting position of the received image data, and moves the process to step S112 to determine whether another image is registered in the acquired domain. When the determination is YES, the CPU 1010 moves the process to step S113, and when the determination is NO, the CPU 1010 moves the process to step S119. In step S113, the CPU 1010 determines whether the shooting direction of the received image data is identical to the shooting direction of the image data registered in the domain. When the determination is YES, the CPU 1010 moves the process to step S114, and when the determination is NO, the CPU 1010 moves the process to step S119. In step S114, the CPU 1010 determines whether the shooting angle of elevation of the received image data is identical to the shooting angle of elevation of the image data registered in the domain. When the determination is YES, the CPU 1010 moves the process to step S115, and when the determination is NO, the CPU 1010 moves the process to step S119. In step S115, the CPU 1010 compares the received image data with the image data registered in the domain to determine whether the degree of similarity lies within a predetermined range. When the determination is YES, the CPU 1010 moves the process to step S119, and when the determination is NO, the CPU 1010 moves the process to step S116. In step S116, the CPU 1010 divides the domain, and moves the process to step S1118 to determine whether the image need to be registered in the divided domain. When the determination is YES, the CPU 1010 moves the process to step S113, and when the determination is NO, the CPU 1010 moves the process to step S119.

In step S119, the CPU 1010 registers the received image data classified by the shooting condition, and terminates the process to return the process to the main process.

Although the CPU 1010 automatically determines the shooting condition or the degree of similarity in the comparison of a registered image in step S115, interactive determination (the CPU 1010 requests determination and makes determination according to the input) or semi-automatic determination (combination of automatic determination and interactive determination) is possible.

Figure 28:
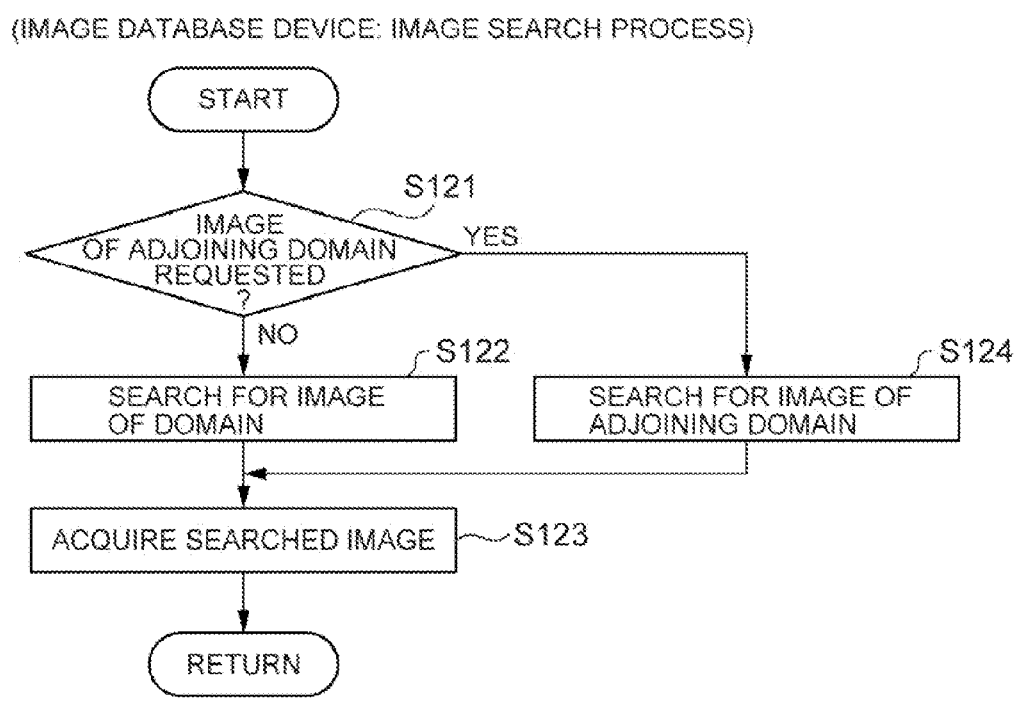
FIG. 28 is a flowchart of an image search process of the image database device.

FIG. 28 is a flowchart of the image search process of the image database device 1.

In step S121, the CPU 1010 determines whether there are image data in an adjoining domain. When the determination is YES, the CPU 1010 moves the process to step S124, and when the determination is NO, the CPU 1010 moves the process to step S122. In step S122, the CPU 1010 executes an image search in the domain, and moves the process to step S123.

In step S123, the CPU 1010 acquires the searched image data, then terminates the process and returns the process to the main process.

In step S124, the CPU 1010 searches for an image in an adjoining domain, and moves the process to step S123.

Figure 29:
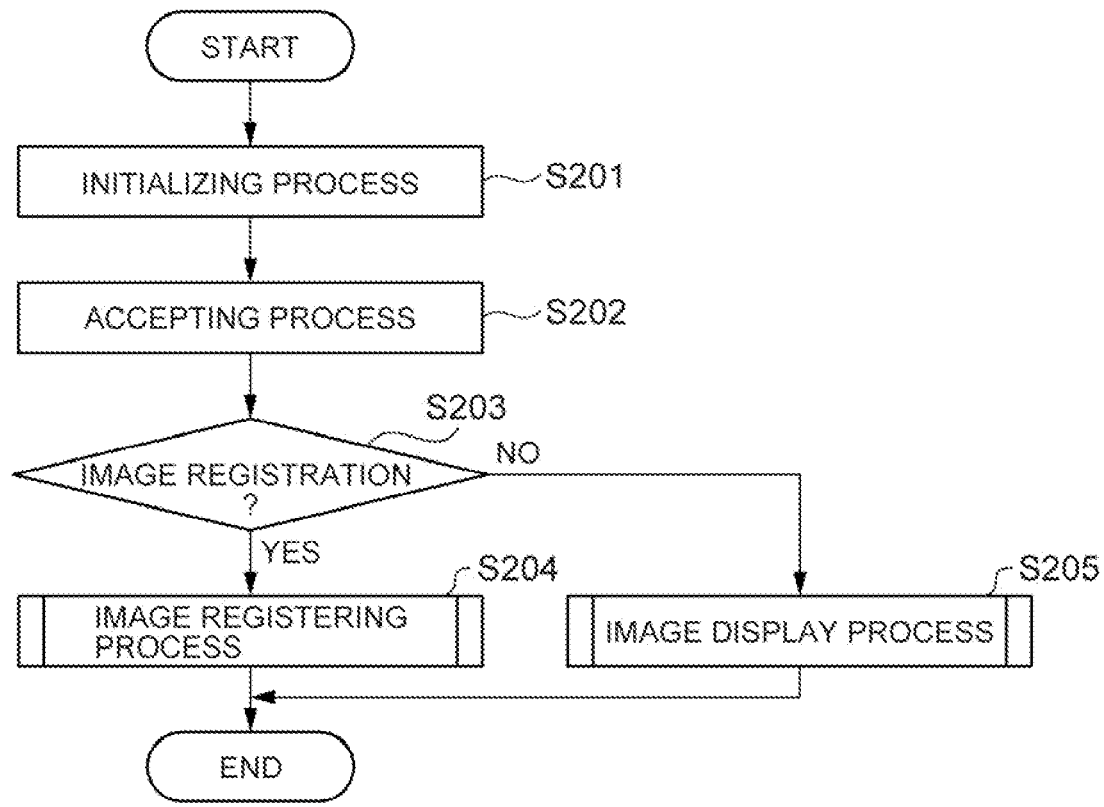
FIG. 29 is a main flowchart of the image processing unit.

FIG. 29 is a main flowchart of the image processing unit 11.

The CPU 2010 performs an initialization process in step S201, and moves the process to step S202. In step S202, the CPU 2010 performs an accepting process of accepting a process condition, and moves the process to step S203. In step S203, the CPU 2010 determines whether the processing content requires image registration. When the determination is YES, the CPU 2010 moves the process to step S204, and when the determination is NO, the CPU 2010 moves the process to step S205. In step S204, the CPU 2010 performs an image registering process, and terminates the process thereafter.

In step S205, the CPU 2010 performs an image display process, and terminates the process thereafter.

Figure 30:
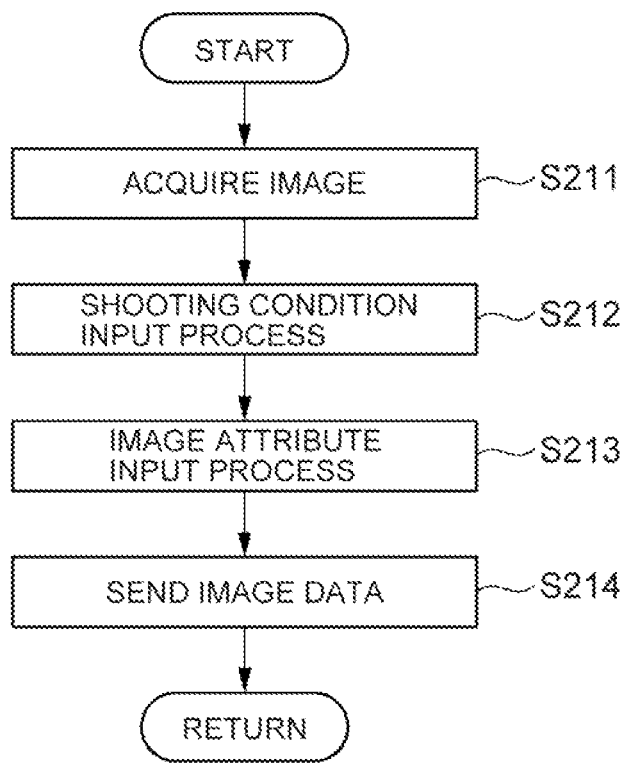
FIG. 30 is a flowchart of an image registering process of the image processing unit.

FIG. 30 is a flowchart of the image registering process of the image processing unit 11.

The CPU 2010 performs an image acquiring process in step S211, and moves the process to step S212. In step S212, the CPU 2010 accepts an input made by the user, such as the shooting condition, stores the shooting condition or the like input by the user, and moves the process to step S213. In step S213, the CPU 2010 accepts an input made by the user, such as the image attribute, stores the image attribute or the like input by the user, and moves the process to step S214. In step S214, the CPU 2010 transmits information, such as the stored image data, shooting condition and image attribute, to the image database device 1 over the Internet, and terminates the process to return to the main process.

Figure 31:
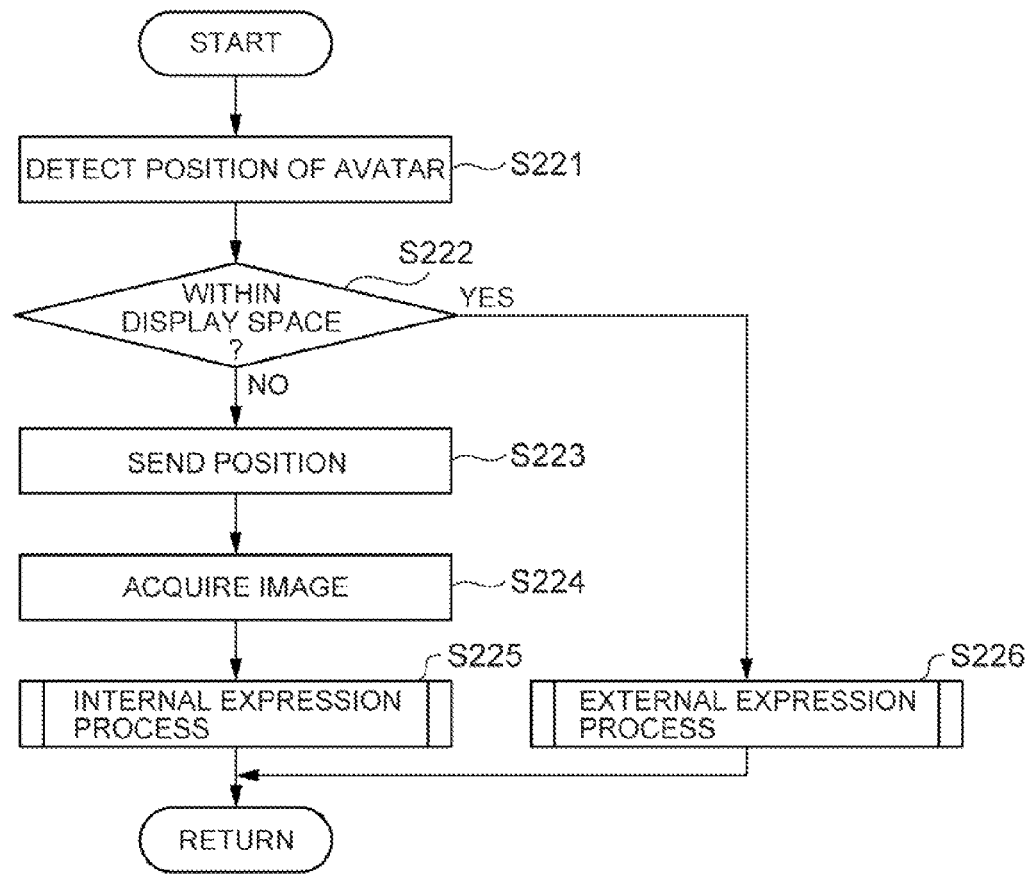
FIG. 31 is a flowchart of an image display process of the image processing unit.

FIG. 31 is a flowchart of the image display process of the image processing unit 11.

The CPU 2010 detects the position of an avatar in step S221, and moves the process to step S222. In step S222, the CPU 2010 determines whether the detected position lies in the display space. When the determination is YES, the CPU 2010 moves the process to step S226, and when the determination is NO, the CPU 2010 moves the process to step S223. In step S223, the CPU 2010 transmits position data to the image database device 1 over the network 10, and moves the process to step S224. In step S224, the CPU 2010 acquires image data received from the image database device 1 over the network 10, and moves the process to step S225. In step S225, the CPU 2010 performs an internal expression process for display space, and terminates the process to return the process to the main process.

The CPU 2010 performs an external expression process for display space in step S226, and terminates the process to return the process to the main process.

Figure 32:
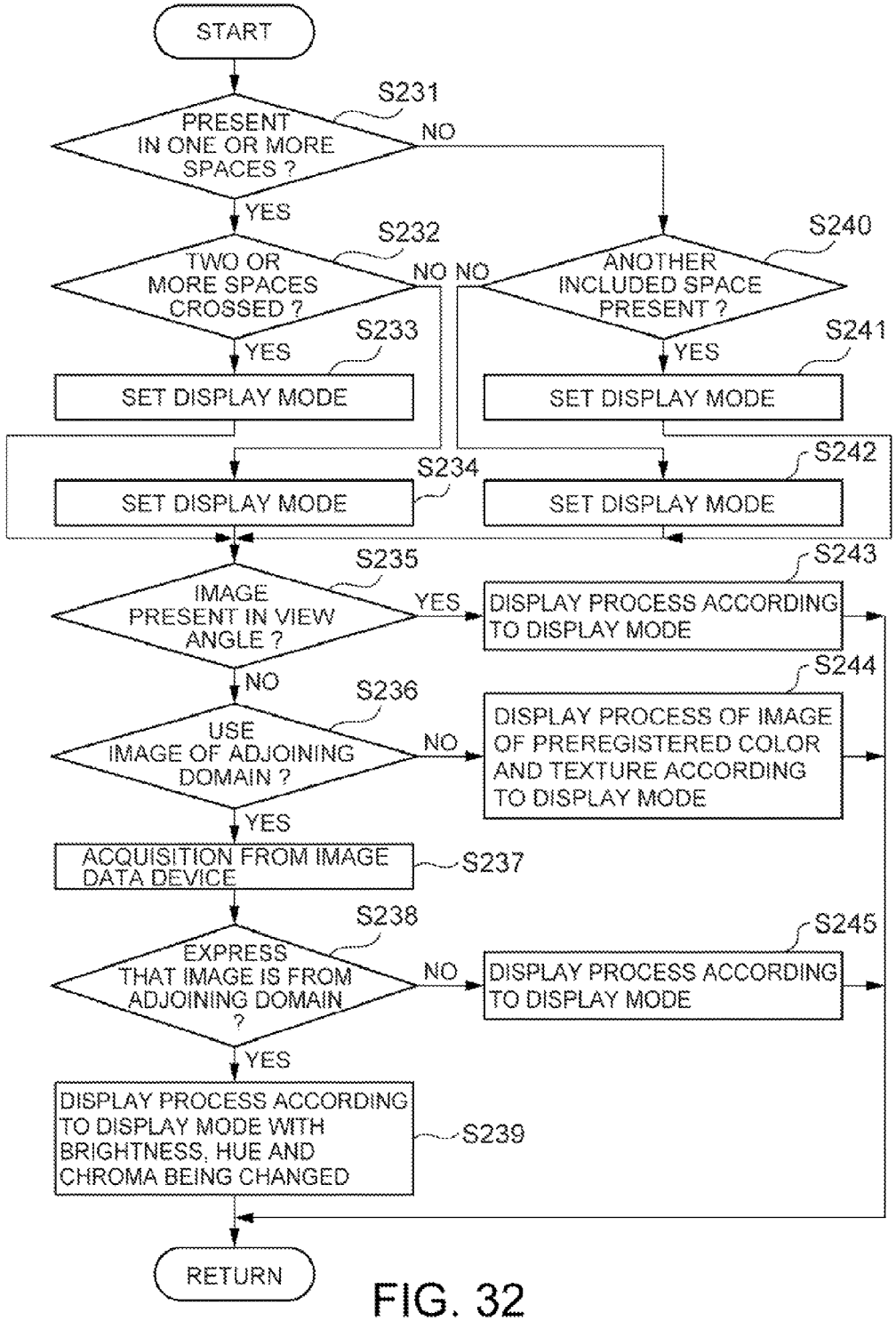
FIG. 32 is a flowchart of an internal expression process for display space of the image processing unit.

FIG. 32 is a flowchart of the internal expression process for display space of the image processing unit 11.

In step S231, the CPU 2010 determines whether an avatar is present in one or more spaces. When the determination is YES, the CPU 2010 moves the process to step S232, and when the determination is NO, the CPU 2010 moves the process to step S240. In step S232, the CPU 2010 determines whether two or more spaces cross one another. When the determination is YES, the CPU 2010 moves the process to step S233, and when the determination is NO, the CPU 2010 moves the process to step S234. The CPU 2010 sets the display mode in step S233, and moves the process to step S235.

The CPU 2010 sets the display mode in step S234, and moves the process to step S235.

In step S235, the CPU 2010 determines whether an image is present within the view angle. When the determination is YES, the CPU 2010 moves the process to step S243, and when the determination is NO, the CPU 2010 moves the process to step S236. In step S236, the CPU 2010 determines whether or not to use an image in an adjoining domain. When the determination is YES, the CPU 2010 moves the process to step S237, and when the determination is NO, the CPU 2010 moves the process to step S244. In step S237, the CPU 2010 acquires an image in the adjoining domain from the image database device 1, and moves the process to step S238. In step S238, the CPU 2010 determines whether or not to indicate that it is an image from an adjoining domain. When the determination is YES, the CPU 2010 moves the process to step S239, and when the determination is NO, the CPU 2010 moves the process to step S245. In step S239, the CPU 2010 performs a display process according to the display mode with the brightness, hue and color of the image being changed, then terminates the process to return the process to the image display process.

In step S240, the CPU 2010 determines whether there is another included space. When the determination is YES, the CPU 2010 moves the process to step S241, and when the determination is NO, the CPU 2010 moves the process to step S242. In step S241, the CPU 2010 sets the display mode, and moves the process to step S235.

In step S242, the CPU 2010 sets the display mode, and moves the process to step S235.

In step S243, the CPU 2010 performs the display process according to the display mode, then terminates the process to return the process to the image display process.

In step S244, the CPU 2010 performs the display process for an image with a preregistered color and texture according to the display mode, then terminates the process to return the process to the image display process.

In step S245, the CPU 2010 performs the display process according to the display mode, then terminates the process to return the process to the image display process.

Figure 33:
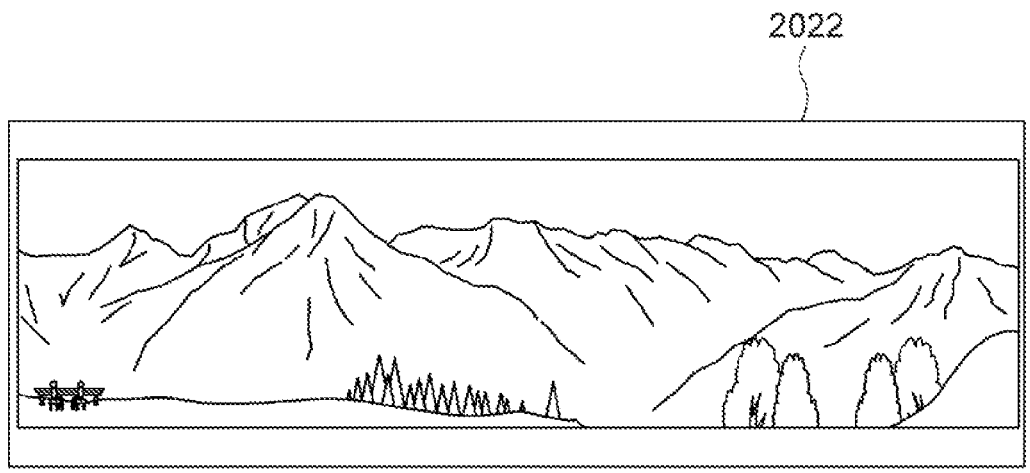
FIG. 33 is a diagram showing an example of a panoramic image in display space.

FIG. 33 is a diagram showing an example of a panoramic image in display space in the image processing unit 11. It is illustrated that based on the position of an avatar, data received over the Internet is rendered in display space and is displayed on the display device 2022. The displayed image is acquired by using multi-display techniques, such as overlaying and scrolling, of a real shot image in the view direction associated with the domain including the viewpoint position and a real shot image corresponding to the view direction associated with an adjoining domain to the domain including the viewpoint position.

FIG. 34 is a diagram showing an example of a search for an adjoining domain. The illustration is given of a method of expressing the label of a domain by a binary number explained above referring to FIG. 6. That is, for normalized space with a lower left end being (0, 0) and an upper right end being (1, 1), quad-segmentation is executed recursively to divide a domain. When quad-segmentation is uniformly repeated three times, with n=3, for example, the domain is divided into $2^3 \times 2^3 = 64$ domains. In this case, the labels of the lower left end and the upper right end respectively become $(0(½)^3, 0(½)^3) = (000, 000)$ and $(7(½)^3, (7(½)^3) = (111, 111)$. In the diagram, numerals indicate the labels of the respective domains. For example, let us specifically obtain adjoining domains of a domain $(3(½)^3, 5(½)^3) = (011, 101)$ with degree of division n=3 and position k=3. Here, the domain (011, 101) corresponds to the domain ID S-132.

In FIG. 34(1), in case of uniform division, adjoining domains to the domain (011, 101) are expressed as domains with the following labels according to the equations illustrated referring to FIG. 6.

An adjoining domain on the North side is expressed by $(3(½)^3, (5+1)(½)^3) = (011, 110)$.

An adjoining domain on the North East side is expressed by $((3+1)(½)^3, (5+1)(½)^3) = (100, 110)$.

An adjoining domain on the East side is expressed by $((3+1)(½)^3, 5(½)^3) = (100, 101)$.

An adjoining domain on the South East side is expressed by $((3+1)(½)^3, (5-1)(½)^3) = (100, 100)$.

An adjoining domain on the South side is expressed by $(3(½)^3, (5-1)(½)^3) = (011, 100)$.

An adjoining domain on the South West side is expressed by $((3-1)(½)^3, (5-1)(½)^3) = (010, 100)$.

An adjoining domain on the West side is expressed by $((3-1)(½)^3, 5(½)^3) = (010, 101)$.

An adjoining domain on the North West side is expressed by $((3-1)(½)^3, (5+1)(½)^3) = (010, 110)$.

In FIG. 34(2), in case where division is not carried out uniformly (rough degree of division), adjoining domains to the domain (011, 101) are expressed as domains with the following labels.

With the degree of division m=2, for example, an adjoining domain on the North side is expressed by $(int(3/2^{3-2})(½)^2, int((5+1)/2^{3-2})(½)^2) = (1(½)^2, 3(½)^2) = (01, 11)$.

With the degree of division m=2, for example, an adjoining domain on the North East side is expressed by $(int((3+1)/2^{3-2})(½)^2, int((5+1)/2^{3-2})(½)^2) = (2(½)^2, 3(½)^2) = (10, 11)$.

With the degree of division m=2, for example, an adjoining domain on the East side is expressed by $(int((3+1)/2^{3-2}(½)^2, int(5/2^{3-2})(½)^2) = (2(½)^2, 2(½)^2) = (10, 10)$.

With the degree of division m=2, for example, an adjoining domain on the South East side is expressed by $(int((3+1)/2^{3-2})$ $(½)^2$, $int((5-1)/2^{3-2})$ $(½)^2)=(2(½)^2, 2(½)^2)=(10, 10)$.

With the degree of division m=3, for example, an adjoining domain on the South side is expressed by $(int (3/2^{3-3})$ $(½)^3$, $int((5-1)/2^{3-3})$ $(½)^3)=(3(½)^3, 4(½)^3)=(011, 100)$.

With the degree of division m=3, for example, an adjoining domain on the South West side is expressed by $(int((3-1)/2^{3-3})$ $(½)^3$, $int((5-1)/2^{3-3})$ $(½)^3)=(2(½)^3, 4(½)^3)=(010, 100)$.

With the degree of division m=3, for example, an adjoining domain on the West side is expressed by $(int((3-1)/2^{3-3})$ $(½)^3$, $int (5/2^{3-3})$ $(½)^3)=(2(½)^3, 5(½)^3)=(010, 101)$.

With the degree of division m=3, for example, an adjoining domain on the North West side is expressed by $(int((3-1)/2^{3-2})$ $(½)^2$, $int((5+1)/2^{3-2})$ $(½)^2)=(1(½)^2, 3(½)^2)=(01, 11)$.

In FIG. 35(3), in case where division is not carried out uniformly (fine degree of division), adjoining domains to the domain (011, 101) are expressed as domains with the following labels.

With the degree of division m=4, for example, s is all the values of $0 \leq s < 2^{4-3}$, i.e., 0 and 1, so that there are following two adjoining domains on the North side. That is, they are expressed by $((3 \times 2^{4-3}+0)$ $(½)^4$, $((5+1) \times 2^{4-3})$ $(½)^4)=(6(½)^4, 12(½)^4)=(0110, 1100)$ and $((3 \times 2^{4-3}+1)$ $(½)^4$, $((5+1) \times 2^{4-3})$ $(½)^4)=(7(½)^4, 12(½)^4)=(0111, 1100)$.

With the degree of division m=4, for example, an adjoining domain on the North East side is expressed by $((3+1) \times 2^{4-3})$ $(½)^4$, $((5+1) \times 2^{4-3})$ $(½)^4)=(8(½)^4, 12(½)^4)=(1000, 1100)$.

With the degree of division m=4, for example, s is all the values of $0 \leq s < 2^{4-3}$, i.e., 0 and 1, so that there are following two adjoining domains on the East side. That is, they are expressed by $((3+1) \times 2^{4-3})$ $(½)^4$, $(5 \times 2^{4-3}+0)$ $(½)^4)=(8(½)^4, 10(½)^4)=(1000, 1010)$ and $((3+1) \times 2^{4-3})$ $(½)^4$, $(5 \times 2^{4-3}+1)$ $(½)^4)=(8(½)^4, 11(½)^4)=(1000, 1011)$.

With the degree of division m=4, for example, an adjoining domain on the South East side is expressed by $((3+1) \times 2^{4-3})$ $(½)^4$, $(5 \times 2^{4-3}-1)$ $(½)^4)=(8(½)^4, 9^4)=(1000, 1001)$.

With the degree of division m=4, for example, s is all the values of $0 \leq s < 2^{4-3}$, i.e., 0 and 1, so that there are following two adjoining domains on the North side. That is, they are expressed by $((3 \times 2^{4-3}+0)$ $(½)^4$, $(5 \times 2^{4-3}-1)$ $(½)^4)=(6(½)^4, 9(½)^4)=(0110, 1001)$ and $((3 \times 2^{4-3}+1)$ $(½)^4$, $(5 \times 2^{4-3}-1)$ $(½)^4)=(7(½)^4, 9(½)^4)=(0111, 1001)$.

With the degree of division m=4, for example, an adjoining domain on the South West side is expressed by $(3 \times 2^{4-3}-1)$ $(½)^4$, $(5 \times 2^{4-3}-1)$ $(½)^4)=(5(½)^4, 9(½)^4)=(0101, 1001)$.

With the degree of division m=4, for example, s is all the values of $0 \leq s < 2^{4-3}$, i.e., 0 and 1, so that there are following two adjoining domains on the West side. That is, they are expressed by $((3 \times 2^{4-3}-1)$ $(½)^4$, $(5 \times 2^{4-3}+0)$ $(½)^4)=(5(½)^4, 10(½)^4)=(0101, 1010)$ and $((3 \times 2^{4-3}-1)$ $(½)^4$, $(5 \times 2^{4-3}+1)$ $(½)^4)=(5(½)^4, 11(½)^4)=(0101, 1011)$.

With the degree of division m=4, for example, an adjoining domain on the North West side is expressed by $(3 \times 2^{4-3}-1)$ $(½)^4$, $((5+1) \times 2^{4-3})(½)^4)=(5(½)^4, 12(½)^4)=(0101, 1100)$.

According to the embodiment, the image database device 1 receives images shot by a plurality of users through communication over the network 10. The received image has a shooting position represented by common coordinates used among the users, which represent the position where the image is shot, as well as shooting conditions for shooting, and image attributes of the shot image. Then, the received image is compared with an image stored in association with a domain including the shooting position of the received image. On condition that the shooting condition lies within a predetermined range and the degree of similarity of images determined is off a predetermined range as the results of the comparison, the domain is divided, and the received image is stored in association with the divided domain, thereby creating an image database. The division is quad-segmentation, and the image database manages domains with a quadtree (FIG. 4), so that it is possible based on the viewpoint position for displaying the image to easily search for a real shot image in the view direction associated with the domain including the viewpoint position and a real shot image corresponding to the view direction associated an adjoining domain to the domain including the viewpoint position.

Although the embodiment of the present invention has been described above, the invention is not limited to the above-described embodiment. The effects described in the description of the embodiment of the invention are merely most suitable effects the invention brings about, and the effects of the invention are not limited to those described in the description of the embodiment of the invention.

That which is claimed is:

1. An image database device for storing images shot by a plurality of users, comprising:
   a computer processor;
   data receiving unit for conducting communication over a network to receive the shot images;
   image storing unit for storing a first image received by the data receiving unit, a shooting position represented by common coordinates used among the users, which represent a position at which the first image is shot, a shooting condition, and an image attribute of the first image;
   domain storing unit for storing a domain of virtual space having a domain range represented by the common coordinates and a shooting direction;
   registration storing unit for storing images to be stored in the image storing unit and the domain stored in the domain storing unit having the domain range including shooting positions and shooting directions of the images in association with each other;
   domain dividing unit for dividing the domain stored in the domain storing unit by changing coordinates in the domain range stored in the domain storing unit and storing the changed coordinates in the domain storing unit, thereby dividing the domain, and re-storing the divided domain, the shooting direction and the shooting position in the registration storing unit;
   control unit for causing the domain dividing unit to divide the domain including the shooting position and the shooting direction on condition that a second image is to be stored in the image storing unit, the second image to be stored in the registration storing unit in association with the domain including the shooting position of the first image satisfy a predetermined requirement, storing the divided domain, and storing the first image and second image in the image storing unit in association with each other;
   determining unit for comparing a calculated amount of feature which is a feature of the first image with a calculated amount of feature which is a feature of the second image to acquire a degree of similarity between the first image and the second image; and
   wherein the predetermined requirement is such that a shooting condition lies within a first predetermined range and the degree of similarity acquired by the determining unit is off a second predetermined range;
   wherein the control unit repeats division of the domain by the domain dividing unit on condition that the second image associated with the domain divided by the domain dividing unit exists in the divided domain and the second image and the first image stored in the image storing unit satisfy the predetermined requirement, and store the divided domain and the second image in the registration storing unit in association with each other;

wherein the common coordinates used among the users are a latitude and a longitude; and wherein the shooting condition includes the shooting direction, and, on condition that the shooting direction is off a third predetermined range, the control unit causes the second image having the shooting direction and the domain in the registration storing unit to be stored in association with each other, thereby causing the second image to be classified by the shooting direction.

2. The image database device according to claim 1, wherein the shooting condition includes a shooting angle of elevation, and on condition that the shooting angle of elevation is off a fourth predetermined range, the control unit causes the second image having the shooting angle of elevation and the domain in the registration storing unit to be stored in association with each other, thereby causing the second image to be classified by the shooting angle of elevation.

3. The image database device according to claim 2, wherein the shooting condition includes a shooting date, and on condition that the shooting date is off a fifth predetermined range, the control unit causes the second image having the shooting date and the domain in the registration storing unit to be stored in association with each other, thereby causing the second image to be classified by the shooting date.

4. A method of storing images shot by a plurality of users, comprising:

a data receiving step of conducting communication over a network to receive the shot images;

a step of storing, in an image storing unit, a first image received at the data receiving step, a shooting position represented by common coordinates used among the users, which represent a position at which the first image is shot, a shooting condition, and an image attribute of the first image;

a step of storing a domain of virtual space having a domain range represented by the common coordinates and a shooting direction in a domain storage unit;

a step of storing images to be stored in the image storing unit and the domain stored in the domain storing unit having the domain range including shooting positions and shooting directions of the images in a registration storing unit in association with each other;

a domain dividing step of dividing the domain stored in the domain storing unit by changing coordinates in the domain range stored in the domain storage unit and storing the changed coordinates in the domain storage unit, thereby dividing the domain, and re-storing the divided domain, the shooting direction and the shooting position in the registration storing unit;

a control step of causing the domain dividing step to divide the domain including the shooting position and the shooting direction on condition that a second image is to be stored in the image storing unit, the second image to be stored in the registration storing unit in association with the domain including the shooting position of the first image satisfy a predetermined requirement, storing the divided domain, and storing the first image and second image in the image storing unit in association with each other;

a determining step of comparing a calculated amount of feature which is a feature of the first image with a calculated amount of feature which is a feature of the second image to acquire a degree of similarity between the first image and the second image; and a storing step of storing the divided domain and the second image in the registration storing unit in association with each other; and wherein the predetermined requirement is such that the shooting condition lies within a first predetermined range and the degree of similarity acquired by the determining step is off a second predetermined range;

wherein the control step repeats division of the domain by the domain dividing step on condition that the second image associated with the domain divided by the domain dividing step exists in the divided domain and the second image and the first image stored in the image storing unit satisfy the predetermined requirement;

wherein the common coordinates used among the users are a latitude and a longitude; and wherein the shooting condition includes the shooting direction, and, on condition that the shooting direction is off a third predetermined range, the control step causes the second image having the shooting direction and the domain in the registration storing unit to be stored in association with each other, thereby causing the second image to be classified by the shooting direction.

5. The method according to claim 4, wherein the shooting condition includes a shooting angle of elevation, and on condition that the shooting angle of elevation is off a fourth predetermined range, the control step causes the second image having the shooting angle of elevation and the domain in the registration storing unit to be stored in association with each other, thereby causing the second image to be classified by the shooting angle of elevation.

6. The method according to claim 5, wherein the shooting condition includes a shooting date, and on condition that the shooting date is off a fifth predetermined range, the control step causes the second image having the shooting date and the domain in the registration storing unit to be stored in association with each other, thereby causing the second image to be classified by the shooting date.

7. A computer program product embodied in computer readable memory comprising:

computer readable program codes coupled to the computer readable memory for storing images shot by a plurality of users, the computer readable program codes configured to:

conduct communication over a network to receive the shot images;

store, in an image storing unit, a first image, a shooting position represented by common coordinates used among the users, which represent a position at which the first image is shot, a shooting condition, and an image attribute of the first image;

store a domain of virtual space having a domain range represented by the common coordinates and a shooting direction in a domain storage unit;

store images to be stored in the image storing unit and the domain stored in the domain storing unit having the domain range including shooting positions and shooting directions of the images in a registration storing unit in association with each other;

divide the domain stored in the domain storing unit by changing coordinates in the domain range stored in the domain storage unit and storing the changed coordinates in the domain storage unit, thereby dividing the domain, and re-storing the divided domain, the shooting direction and the shooting position in the registration storing unit;

divide the domain including the shooting position and the shooting direction on condition that a second image is to be stored in the image storing unit, the second image to be stored in the registration storing unit in association with the domain including the shooting position of the first image satisfy a predetermined requirement, storing the divided domain, and storing the first image and second image in the image storing unit in association with each other;

compare a calculated amount of feature which is a feature of the first image with a calculated amount of feature which is a feature of the second image to acquire a degree of similarity between the first image and the second image;

store the divided domain and the second image in the registration storing unit in association with each other; and wherein the predetermined requirement is such that the shooting condition lies within a first predetermined range and the degree of similarity acquired is off a second predetermined range;

wherein the computer readable program code to repeat division of the domain on condition that the second image associated with the domain exists in the divided domain and the second image and the first image stored in the image storing unit satisfy the predetermined requirement, and wherein the common coordinates used among the users are a latitude and a longitude;

wherein the shooting condition includes the shooting direction, and on condition that the shooting direction is off a third predetermined range, the computer readable program code causes the image having the shooting direction and the domain in the registration storing unit to be stored in association with each other, thereby causing the second image to be classified by the shooting direction.

8. The computer program product according to claim 7, wherein the shooting condition includes a shooting angle of elevation, and on condition that the shooting angle of elevation is off a fourth predetermined range, the computer readable program code causes the image having the shooting angle of elevation and the domain in the registration storing unit to be stored in association with each other, thereby causing the second image to be classified by the shooting angle of elevation.

9. The computer program product according to claim 8, wherein the shooting condition includes a shooting date, and on condition that the shooting date is off a fifth predetermined range, the computer readable program code causes the second image having the shooting date and the domain in the registration storing unit to be stored in association with each other, thereby causing the second image to be classified by the shooting date.

* * * * *